United States Patent
Chen et al.

(10) Patent No.: US 11,307,722 B2
(45) Date of Patent: Apr. 19, 2022

(54) DISPLAY PANEL, DISPLAY DEVICE AND METHOD FOR PREPARING A DISPLAY PANEL

(71) Applicant: Xiamen Tianma Micro-Electronics Co., Ltd., Xiamen (CN)

(72) Inventors: Fang Chen, Wuhan (CN); Le Ta, Wuhan (CN); Zhiqiang Xia, Wuhan (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/336,302

(22) Filed: Jun. 2, 2021

(65) Prior Publication Data

US 2021/0286471 A1   Sep. 16, 2021

(30) Foreign Application Priority Data

Feb. 24, 2021   (CN) .......................... 202110210050.2

(51) Int. Cl.
  *G06F 3/041* (2006.01)
  *G06F 3/044* (2006.01)
  *H01L 27/32* (2006.01)

(52) U.S. Cl.
  CPC .......... *G06F 3/0445* (2019.05); *G06F 3/0412* (2013.01); *G06F 2203/04103* (2013.01); *H01L 27/3234* (2013.01)

(58) Field of Classification Search
  CPC ......... G06F 3/041–047; H01L 27/3225–3293; H01L 51/525; H01L 51/524; H01L 27/323; H01L 27/3234
  See application file for complete search history.

(56) References Cited

U.S. PATENT DOCUMENTS

2021/0193751 A1*   6/2021   Jang ...................... G06F 3/0446

FOREIGN PATENT DOCUMENTS

| CN | 110416435 A | 11/2019 |
|----|-------------|---------|
| CN | 111538443 A | 8/2020  |

* cited by examiner

*Primary Examiner* — Sanjiv D. Patel
(74) *Attorney, Agent, or Firm* — Kilpatrick Townsend & Stockton, LLP

(57) ABSTRACT

Provided are a display panel, a display device and a method for preparing a display panel. The display panel includes an opening region, a transition region, and a display region. The display region at least partially surrounds the opening region, and the transition region is disposed between the display region and the opening region. The transition region of the display panel is further provided with at least one wall structure, and the at least one wall structure surrounds the opening region. The display panel further includes a substrate and a sub-pixel array disposed on the substrate and disposed in the display region, a first organic encapsulation layer, a second organic encapsulation layer, and a barrier structure. The first organic encapsulation layer is disposed on a side of the at least one wall structure facing the display region.

16 Claims, 21 Drawing Sheets

DISPLAY PANEL, DISPLAY DEVICE AND METHOD FOR PREPARING A DISPLAY PANEL

CROSS-REFERENCE TO RELATED APPLICATION

This application claims priority to Chinese Patent Application No. 202110210050.2 filed Feb. 24, 2021, the disclosure of which is incorporated herein by reference in its entirety.

FIELD

The present disclosure relates to display techniques and, in particular, to a display panel, a display device and a method for preparing a display panel.

BACKGROUND

With the rapid development of display techniques, touch technology has been applied to various electronic devices and various fields and is more and more sought after by users. Most of the touch display screens in the related art are Oncell, which is a touch electrode structure is arranged on a display panel.

In order to achieve a larger screen-to-body ratio, some display panels use an in-screen digging technology, that is, a digging region for placing hardware such as a front-facing camera is provided in an effective display region. However, for a display panel integrated with a touch function, the in-screen digging technology destroys the uniformity of touch performance of the overall effective display region so that the touch performance is reduced.

SUMMARY

Embodiments of the present disclosure provide a display panel, a display device and a method for preparing the display panel to improve the touch effect of the display panel.

In one embodiment of the present disclosure provides a display panel. The display panel includes an opening region, a transition region, and a display region. The display region at least partially surrounds the opening region, and the transition region is disposed between the display region and the opening region. The transition region of the display panel is further provided with at least one wall structure, and the at least one wall structure surrounds the opening region.

The display panel further includes a substrate, a sub-pixel array, a first organic encapsulation layer, a second organic encapsulation layer, and a barrier structure.

The sub-pixel array is disposed on the substrate and disposed in the display region.

The first organic encapsulation layer is disposed on a side of the sub-pixel array facing away from the substrate and disposed on a side of the at least one wall structure facing the display region.

The second organic encapsulation layer is disposed on a side of the first organic encapsulation layer facing away from the substrate and disposed in the transition region and extends to a portion of the display region.

The barrier structure is configured to separate a second organic encapsulation layer facing the display region from a second organic encapsulation layer facing away from the display region.

In one embodiment of the present disclosure further provides a display device including any display panel described in other embodiments.

In another embodiment of the present disclosure further provides a method for preparing a display panel. The display panel includes a substrate, the substrate includes a reserved opening region, a transition region and a display region, and the display region at least partially surrounds the reserved opening region. The transition region is disposed between the display region and the reserved opening region. The method includes steps described below.

A sub-pixel array is formed in the display region of the substrate and a wall structure is formed in the transition region.

A first organic encapsulation layer is formed on a side of the sub-pixel array facing away from the substrate. The first organic encapsulation layer is disposed on a side of the wall structure facing the display region.

A second organic encapsulation layer is formed on a side of the first organic encapsulation layer facing away from the substrate. The second organic encapsulation layer is disposed in the transition region and extends to a portion of the display region.

A barrier structure is formed in the second organic encapsulation layer. The barrier structure is configured to separate a second organic encapsulation layer facing the display region from a second organic encapsulation layer facing away from the display region.

DETAILED DESCRIPTION

Figure 1:
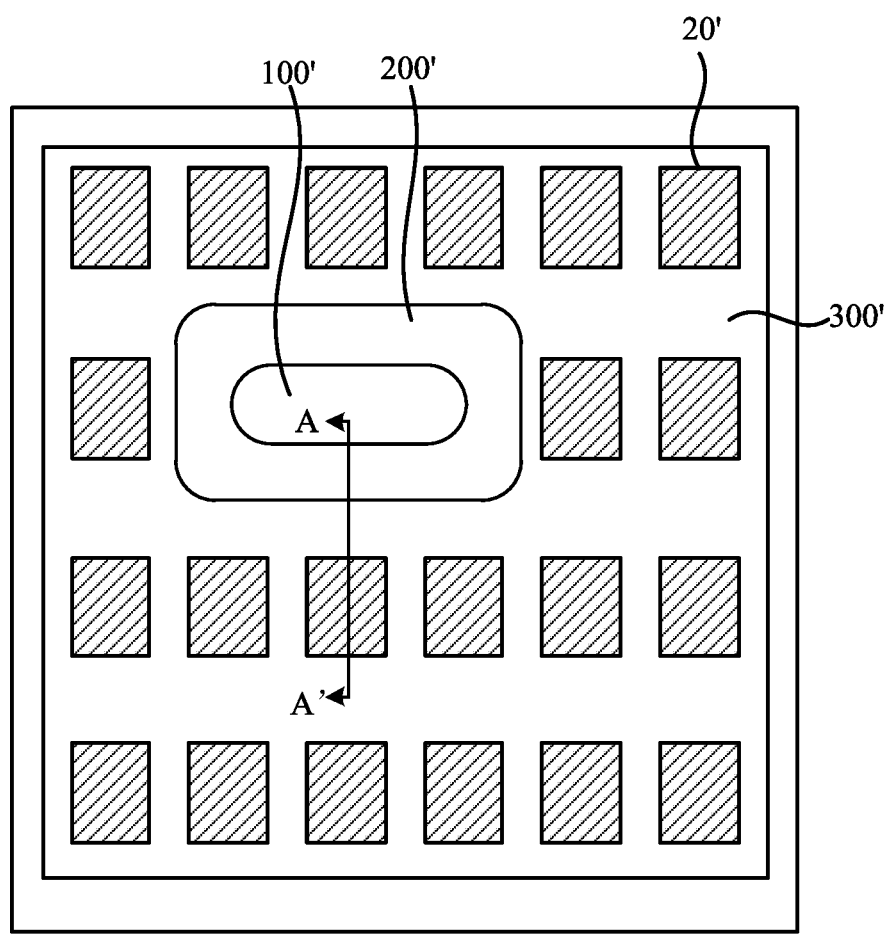
FIG. 1 is a structural diagram of a display panel according to the related art.

Hereinafter the present disclosure will be further described in detail in conjunction with the drawings and embodiments. It is to be understood that the embodiments set forth herein are merely intended to illustrate and not to limit the present disclosure. Additionally, it is to be noted that for ease of description, merely part, not all, of the structures related to the present disclosure are illustrated in the drawings.

Figure 2:
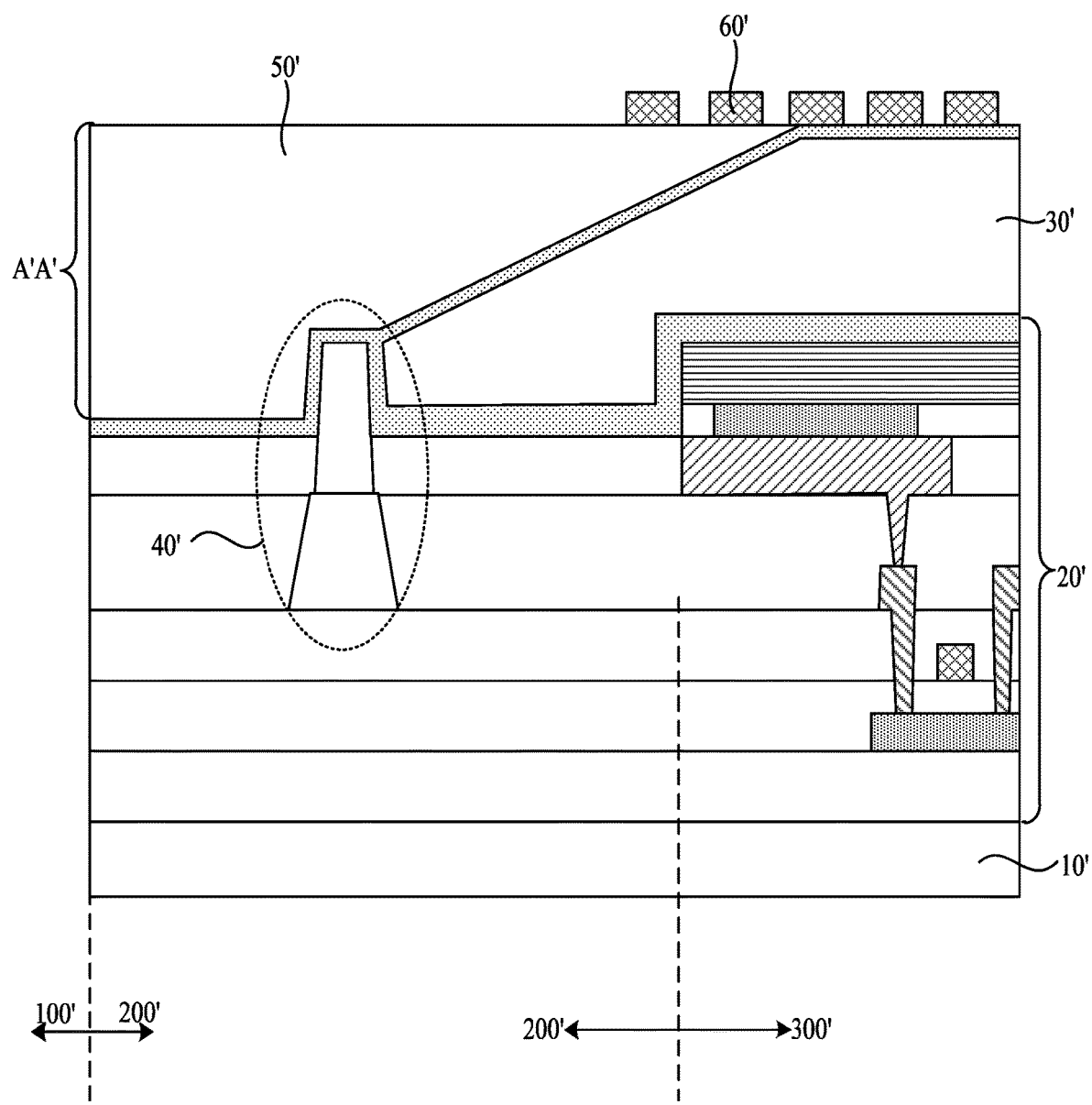
FIG. 2 is a cross-sectional structural diagram of the display panel of FIG. 1 taken along a line AN.

FIG. 1 is a structural diagram of a display panel according to the related art. FIG. 2 is a cross-sectional structural diagram of the display panel of FIG. 1 taken along a line AA'. As shown in FIGS. 1 and 2, a display panel includes an opening region 100', a transition region 200', and a display region 300' in the related art. The display region 300' at least partially surrounds the opening region 100', and the transition region 200' is disposed between the display region 300' and the opening region 100'. The display panel further includes a substrate 10', a sub-pixel array 20', a first organic encapsulation layer 30', and a second organic encapsulation layer 50'. The sub-pixel array 20' is disposed on the substrate 10' and disposed in the display region 300'. The first organic encapsulation layer 30' is disposed on a side of the sub-pixel array 20' facing away from the substrate 10' and disposed on a side of a wall structure 40' facing the display region 300'. The second organic encapsulation layer 50' is disposed on a side of the first organic encapsulation layer 30' facing away from the substrate 10' and disposed in the transition region 200' and extends to a portion of the display region 300'. In the related art, when the display panel is an on cell touch display panel, a touch electrode 60' is disposed on a side of the second organic encapsulation layer 50' facing away from the substrate 10'. Since the second organic encapsulation layer 50' extends from the transition region 200' to the portion of the display region 300', after the preparation of the display panel, the opening region 100' needs to be formed by using a cutting technique. In a process of cutting to form the opening region 100', external water and oxygen enters through the second organic encapsulation layer facing the opening region 100' and corresponding to the A'A' region in FIG. 2, resulting in change of a dielectric constant of the second organic encapsulation layer 50'. The change in the dielectric constant of the second organic encapsulation layer 50' causes the capacitance of the touch electrode 60' disposed on the side of the second organic encapsulation layer 50' facing away from the substrate 10' to change, and causing problems such as abnormal touch control of the display panel.

Figure 3:
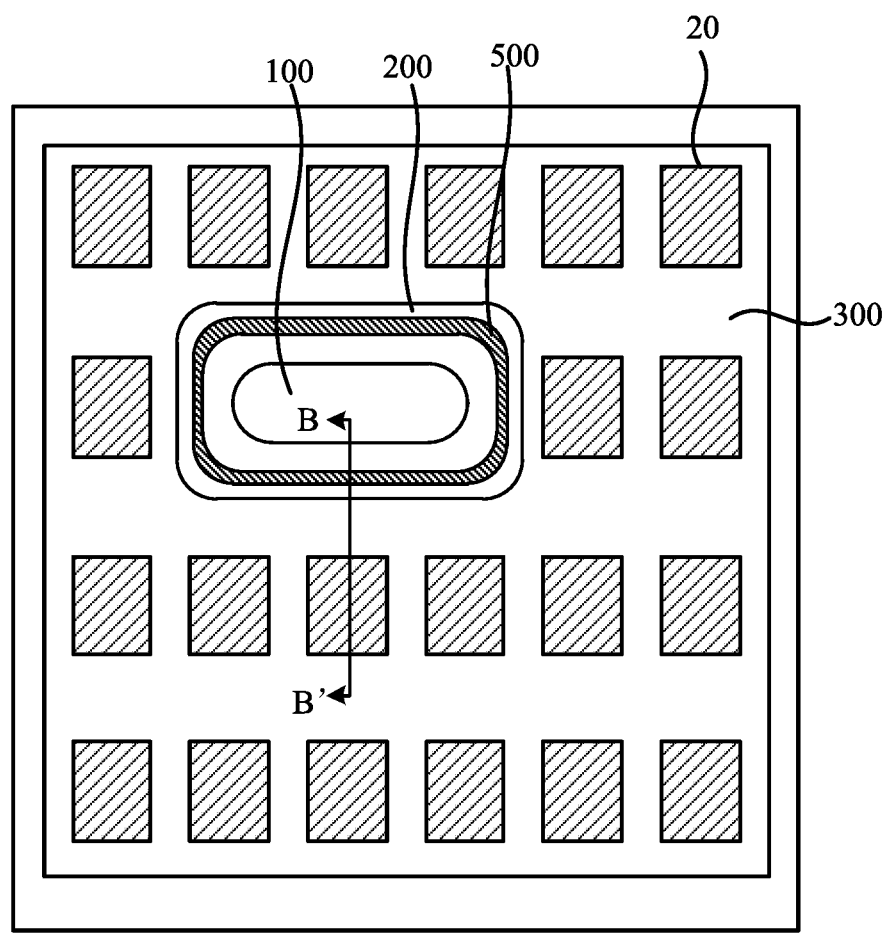
FIG. 3 is a structural diagram of a display panel according to an embodiment of the present disclosure.
Figure 4:
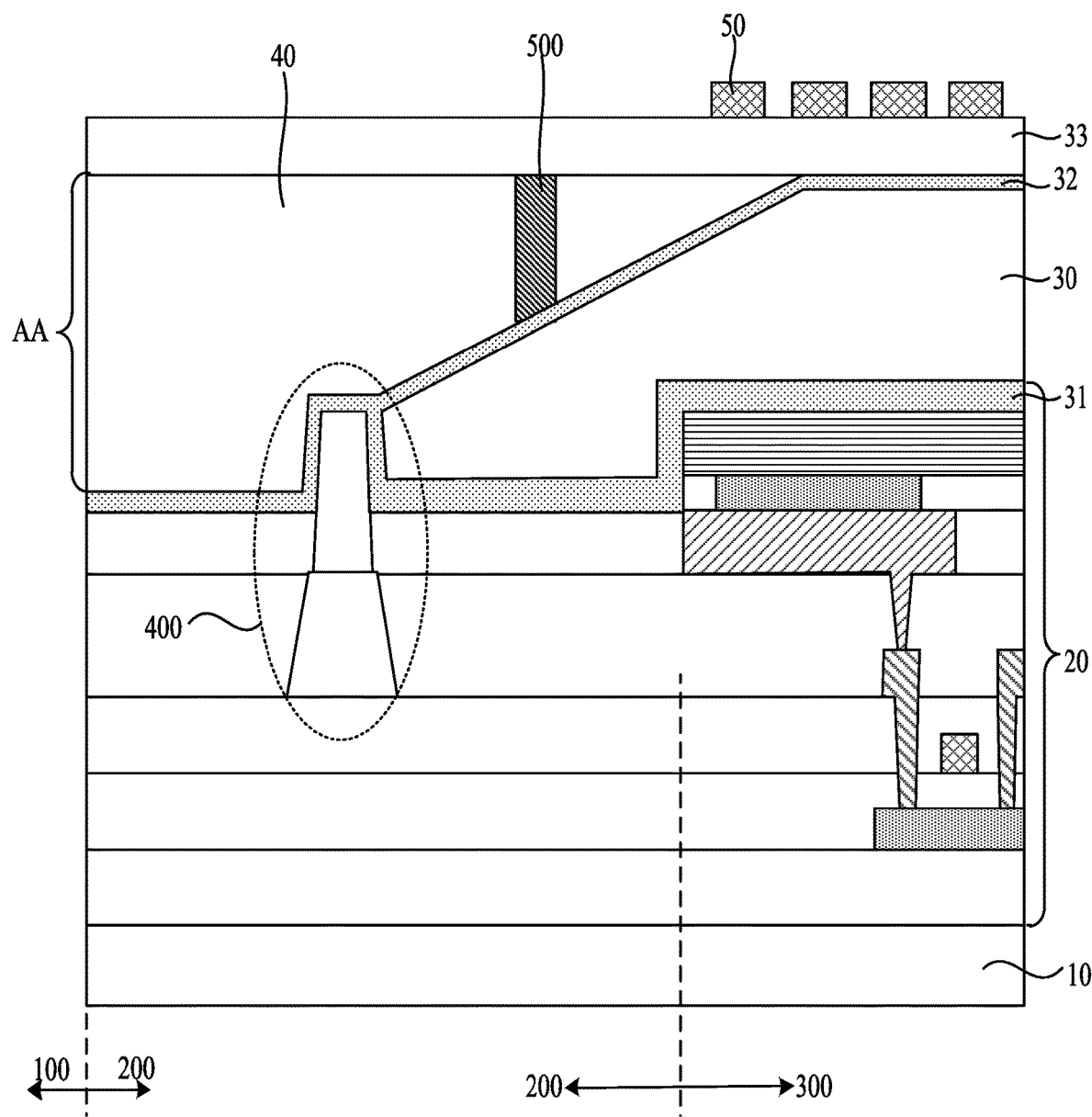
FIG. 4 is a cross-sectional structural diagram of the display panel of FIG. 3 taken along a line BB'.

To solve the above problems, FIG. 3 is a structural diagram of a display panel according to an embodiment of the present disclosure, and FIG. 4 is a cross-sectional structural diagram of the display panel of FIG. 3 taken along a line BB'. In conjunction with FIGS. 3 and 4, a display panel includes an opening region 100, a transition region 200, and a display region 300. The display region 300 at least partially surrounds the opening region 100, and the transition region 200 is disposed between the display region 300 and the opening region 100. The transition region 200 of the display panel is further provided with at least one wall structure 400, and the at least one wall structure 400 surrounds the opening region 100. The display panel further includes a substrate 10, a sub-pixel array 20, a first organic encapsulation layer 30, a second organic encapsulation layer 40, and a barrier structure 500. The sub-pixel array 20 is disposed on the substrate 10 and disposed in the display region 300. The first organic encapsulation layer 30 is disposed on a side of the sub-pixel array 20 facing away from the substrate 10 and disposed on a side of the at least one wall structure 400 facing the display region 300. The second organic encapsulation layer 40 is disposed on a side of the first organic encapsulation layer 30 facing away from the substrate 10 and disposed in the transition region 200 and extends to a portion of the display region 300. The barrier structure 500 is configured to separate a second organic encapsulation layer 40 facing the display region 300 from a second organic encapsulation layer 40 facing away from the display region 300.

As shown in FIG. 3, the display panel includes the opening region 100, the transition region 200, and the display region 300, and the transition region 200 is disposed between the display region 300 and the opening region 100. The opening region 100 is a region in which each film structure of the display panel is removed and to ensure a light transmittance of the opening region 100, and the opening region 100 of the display panel is provided with a light sensing element or the like to achieve a function such as photographing of the display panel.

It is to be noted that FIG. 4 exemplarily illustrates that each film structure of the display panel located in the opening region 100 is removed, and in other embodiments, only a portion of the film structure may be removed and a portion of the film with a high light transmittance may be retained. The embodiment of the present disclosure does not limit the specific structure of the opening region 100.

Exemplarily, in conjunction with FIGS. 3 and 4, the display panel includes the substrate 10 and the sub-pixel array 20 (FIG. 4 exemplarily illustrates a structural diagram of a film of one sub-pixel) disposed on the substrate 10 and disposed in the display region 300. Each sub-pixel is driven to emit light and the display of the display panel is achieved.

As shown in FIG. 4, the first organic encapsulation layer 30 is disposed on the side of the sub-pixel array 20 facing away from the substrate 10 and disposed on the side of the wall structure 400 facing the display region 300 and to protect the sub-pixel array 20 and avoid the invasion of external water vapor or oxygen to light-emitting elements in the sub-pixel. However, since a material of the first organic encapsulation layer 30 has poor blocking performance to the water vapor and the oxygen, the water vapor and the oxygen may intrude from the first organic encapsulation layer 30 and then extend to the display region 300. As a result, the light-emitting elements in the sub-pixel are corroded by the water vapor and the oxygen to appear adverse reaction, and affecting the lifetime and light-emitting performance of the light-emitting elements. Therefore, the transition region 200 of the display panel is provided with at least one wall structure 400, and the at least one wall structure 400 is utilized to block the water vapor and the oxygen intruded to the light-emitting elements so that the light-emitting performance of the light-emitting elements is ensured.

It is to be noted that one wall structure 400 is exemplarily disposed in the transition region 200 of the display panel in FIGS. 3 and 4. In other embodiments, wall structures 400 may be provided, and the number of wall structures 400 is not specifically limited in the embodiment of the present disclosure.

After the preparation of the first organic encapsulation layer 30 is completed, the side of the first organic encapsulation layer 30 facing away from the substrate 10 is formed with the second organic encapsulation layer 40, and the second organic encapsulation layer 40 is utilized to achieve the planarization between the display region 300 and the transition region 200. Since the second organic encapsulation layer 40 extends from the transition region 200 to the portion of the display region 300, after the preparation of the display panel is completed, the opening region 100 needs to be formed by using a cutting technique. However, a side of the second organic encapsulation layer 40 facing the opening region 100 is not protected by an inorganic encapsulation layer, and in a process of cutting to form the opening region 100, entering of the external water vapor or contamination of irons to the second organic encapsulation layer 40 causes the change of a dielectric constant of the second organic encapsulation layer 40. The change in the dielectric constant of the second organic encapsulation layer 40 causes the capacitance of the touch electrode 50 disposed on the side of the second organic encapsulation layer 40 facing away from the substrate 10 to change, and causing problems such as abnormal touch control of the display panel. Exemplarily, as shown in FIG. 4, after cutting to form the opening region 100, water and oxygen in the external environment can enter the second organic encapsulation layer through the AA opening, so that the dielectric constant of the second organic encapsulation layer is affected. Therefore, the display panel is provided with the barrier structure 500, and the barrier structure 500 is utilized to separate the second organic encapsulation layer 40 facing the display region 300 from the second organic encapsulation layer 40 facing away from the display region 300, so that the water vapor or ions are prevented from invading or polluting the second organic encapsulation layer 40 facing the display region 30 due to the opening region 100 formed by cutting, and thus the dielectric constant of the second organic encapsulation layer 40 facing the display region 300 is avoided from being affected by invasion of the water vapor or the contamination of the irons, and ensuring the touch effect of the touch electrode 50 on the side of the second organic encapsulation layer 40 facing away from the substrate 10.

In the display panel provided by the embodiments of the present disclosure, the display panel is provided with the barrier structure, and the barrier structure is utilized to separate the second organic encapsulation layer facing the display region from the second organic encapsulation layer facing away from the display region, so that the outside water vapor or ions are prevented from invading or polluting the second organic encapsulation layer facing the display region due to the opening region formed by cutting, and the touch effect of the touch electrode on the side of the second organic encapsulation layer facing away from the substrate is ensured.

Figure 5:
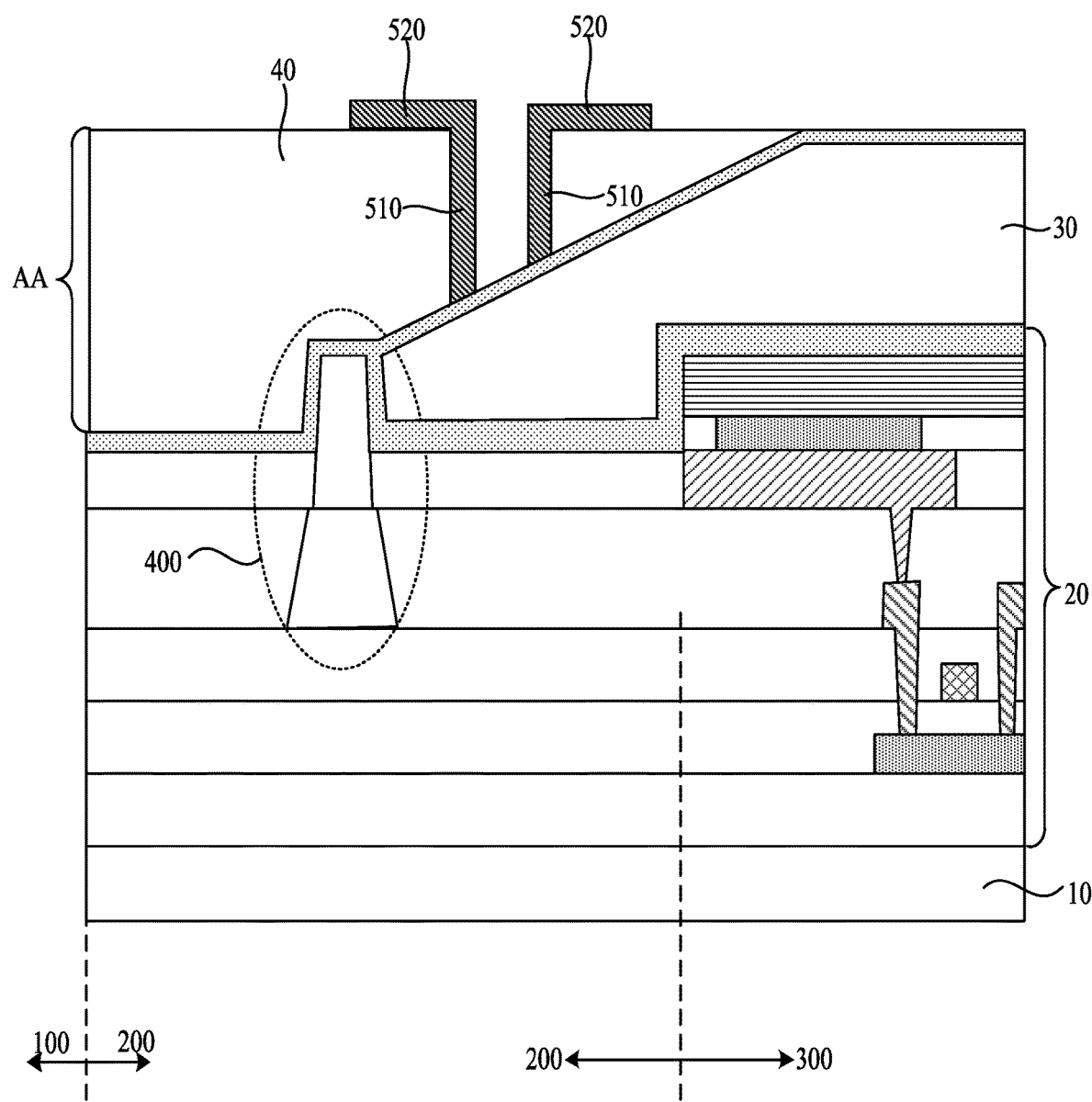
FIG. 5 is a cross-sectional structural diagram of another display panel according to an embodiment of the present disclosure.

In an embodiment, on the basis of the above-mentioned embodiments, FIG. 5 is a cross-sectional structural diagram of another display panel according to an embodiment of the present disclosure. As shown in FIG. 5, the barrier structure 500 includes a first portion 510 and a second portion 520, the first portion 510 of the barrier structure 500 is disposed between the wall structure 400 and the display region 300, and the second portion 520 of the barrier structure 500 is disposed on a side of the second organic encapsulation layer 40 facing away from the substrate 10.

As shown in FIG. 5, during formation of the barrier structure 500, the barrier structure 500 is configured to include the first portion 510 and the second portion 520, where the first portion 510 of the barrier structure 500 is disposed between the wall structure 400 and the display region 300, and the second portion 520 of the barrier structure 500 is disposed on the side of the second organic encapsulation layer 40 facing away from the substrate 10, that is, the barrier structure 500 extends to the side of the second organic encapsulation layer 40 facing away from the substrate 10, and further ensuring the blocking of the barrier structure to the external water and oxygen.

Figure 6:
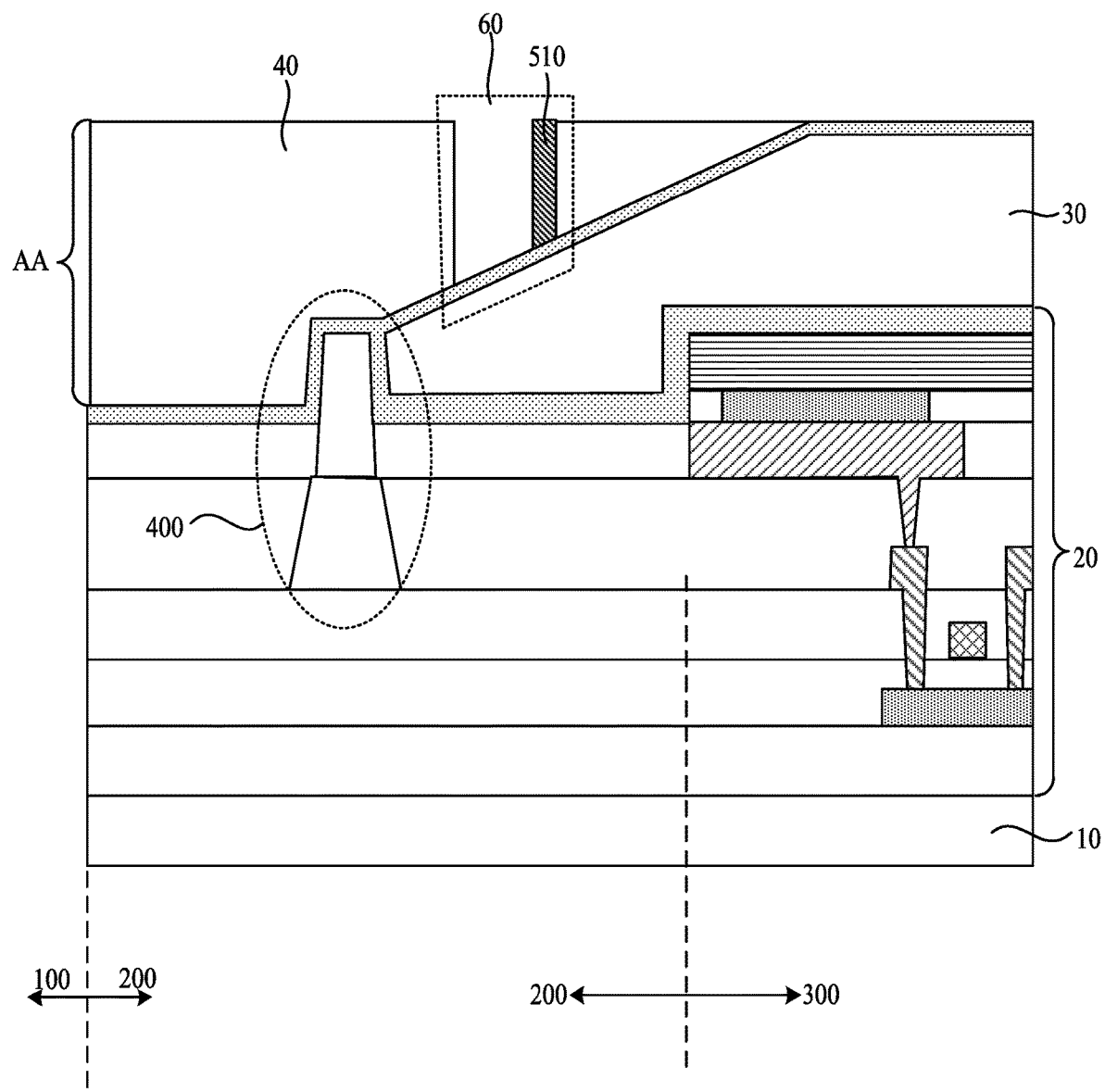
FIG. 6 is a cross-sectional structural diagram of another display panel according to an embodiment of the present disclosure.

In an embodiment, on the basis of the above-mentioned embodiments, FIG. 6 is a cross-sectional structural diagram of another display panel according to an embodiment of the present disclosure. As shown in FIG. 6, the display panel includes a first groove 60, the first groove 60 penetrates through the second organic encapsulation layer 40, and the first portion 510 of the barrier structure covers at least a side wall of the first groove 60 facing the display region 300.

Exemplarily, as shown in FIG. 6, after the display panel is formed with the second organic encapsulation layer 40, the display panel is formed with the first groove 60 and the first groove 60 penetrates through the second organic encapsulation layer 40. When the first portion 510 of the barrier structure covers at least a side wall of the first groove 60 facing the display region 300, in this case, the barrier structure located at the side wall of the first groove 60 can completely separate the second organic encapsulation layer 40 facing the display region 300 and the second organic encapsulation layer 40 facing away from the display region 300 so that the second organic encapsulation layer 40 is disconnected at the transition region 200, and the invasion of the external water and oxygen to the second organic encapsulation layer 40 in the display region 300 through the opening region 100 is disconnected. In this way, the change of the dielectric constant of the second organic encapsulation layer 40 facing the display region 300 is avoided, and the touch effect of the display panel is ensured.

Figure 7:
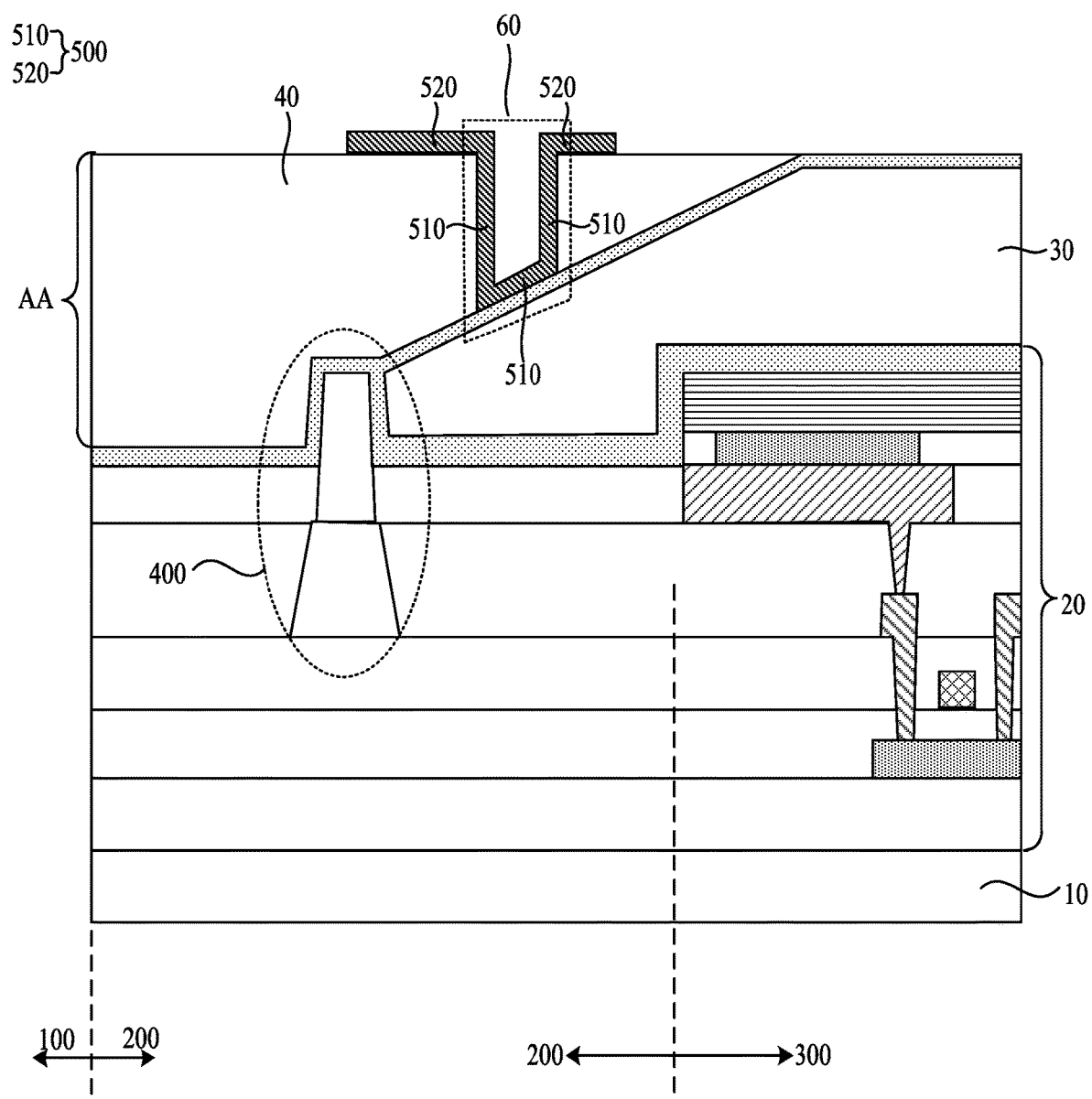
FIG. 7 is a cross-sectional structural diagram of another display panel according to an embodiment of the present disclosure.

In an embodiment, on the basis of the above-mentioned embodiments, FIG. 7 is a cross-sectional structural diagram of another display panel according to an embodiment of the present disclosure. As shown in FIG. 7, the first portion 510 of the barrier structure 500 covers the first groove 60.

Exemplarily, referring to FIG. 7, the first portion 510 of the barrier structure 500 is configured to completely cover the first groove 60, that is, the first portion 510 of the barrier structure 500 coves not only two side walls of the first groove 60, but also a bottom wall of the first groove, that is, when the first portion of the barrier structure is formed through a sputtering technology, the first portion may be directly formed through the sputtering technology, and reducing the process preparation complexity.

Figure 8:
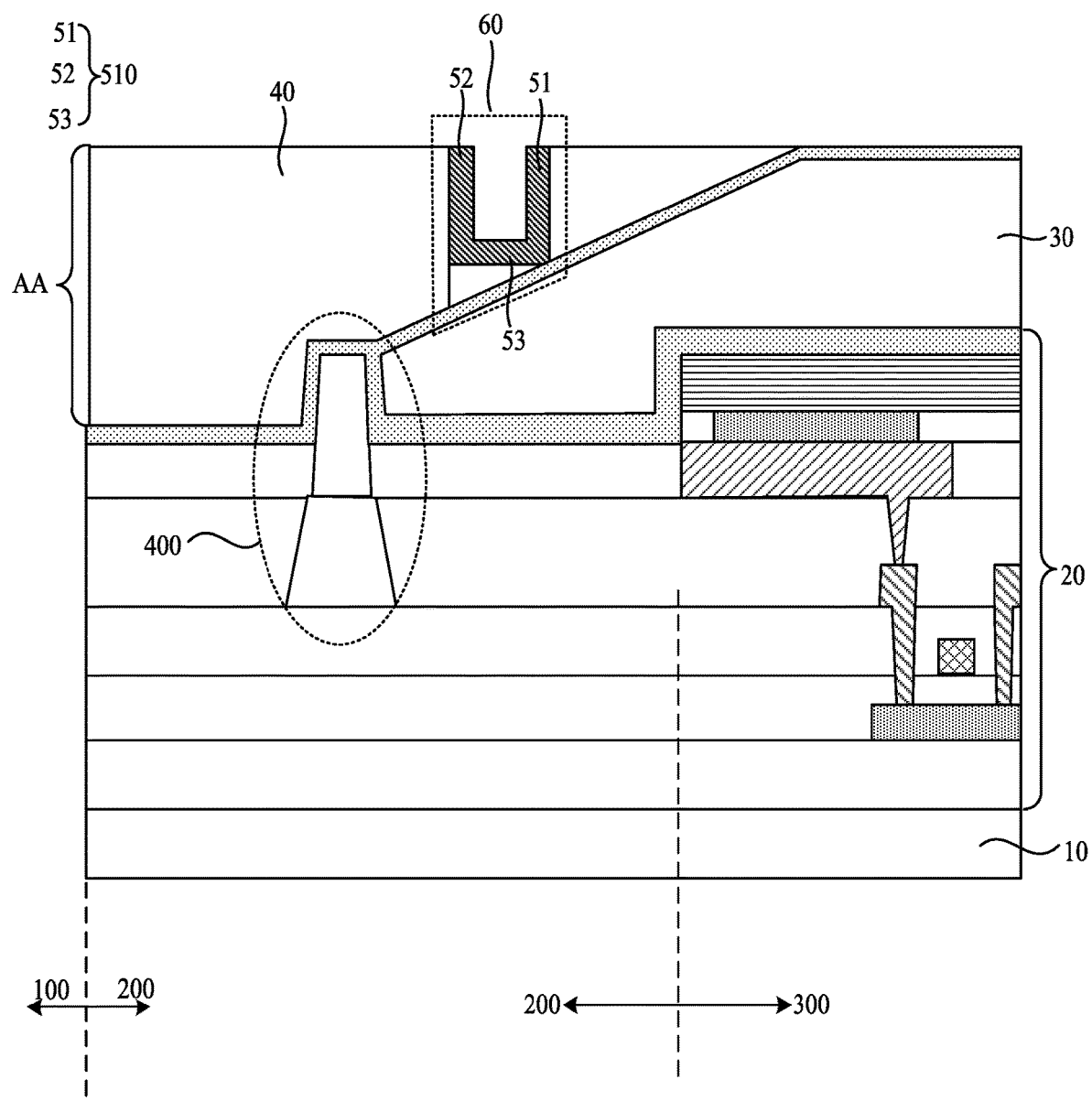
FIG. 8 is a cross-sectional structural diagram of another display panel according to an embodiment of the present disclosure.

In an embodiment, on the basis of the above-mentioned embodiments, FIG. 8 is a cross-sectional structural diagram of another display panel according to an embodiment of the present disclosure. As shown in FIG. 8, the first portion 510 of the barrier structure includes a first sub-portion 51, a second sub-portion 52, and a third sub-portion 53, the first sub-portion 51 is disposed on a side wall of the first groove 60 facing the display region 300, and the second sub-portion 52 is disposed on a side wall of the first groove 60 facing the opening region 100; and a height of the first sub-portion 51 is the same as a height of the second sub-portion 52 along a direction perpendicular to a plane where the substrate 10 is located.

Exemplarily, as shown in FIG. 8, the height of the first sub-portion 51 is the same as the height of the second sub-portion 52 along the direction perpendicular to the plane where the substrate 10 is located, that is, a thickness of the barrier structure formed in the first groove 60 is the same. When the barrier structure is also used as a touch compensation structure, the touch effect of the display panel at the first groove 60 is the same in this case, and the influence on the touch effect of the display panel due to different thicknesses of the barrier structure at different positions is avoided.

It is to be noted that when the first portion 510 of the barrier structure covers only one side wall of the first groove 60, in this case, a vertical projection of the barrier structure on the substrate 10 is an annular structure; and when the first portion 510 of the barrier structure separately covers two side walls of the first groove 60, in this case, the vertical projection of the barrier structure on the substrate 10 is two annular structures. In other embodiments, the display panel may also be provided with barrier structures 500, and the barrier structures are respectively disposed in different first grooves to further ensure the blocking of the barrier structure to the external water and oxygen.

In other implementable embodiments, the first portion 510 of the barrier structure 500 may further be configured to cover a side wall of the first groove 60 facing away from the display region 300. The embodiment of the present disclosure does not limit a specific manner in which the barrier structure 500 covers the first groove 60, as long as the barrier structure 500 can be ensured to block the external water and oxygen.

Figure 9:
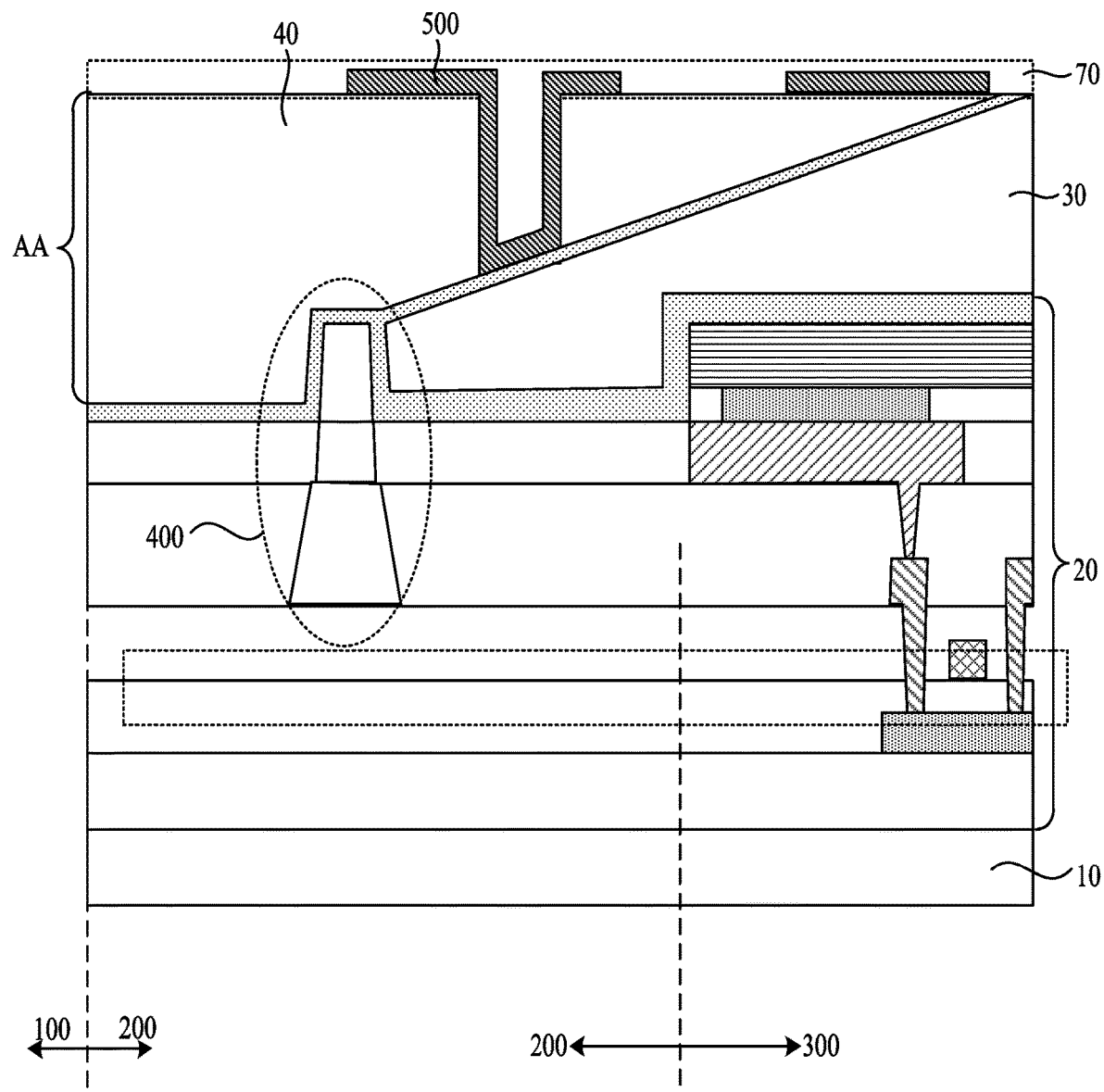
FIG. 9 is a cross-sectional structural diagram of another display panel according to an embodiment of the present disclosure.

In an embodiment, on the basis of the above-mentioned embodiments, FIG. 9 is a cross-sectional structural diagram of another display panel according to an embodiment of the present disclosure. As shown in FIG. 9, the display panel further includes a first metal layer 70, the first metal layer 70 is disposed on a side of the second organic encapsulation layer 40 facing away from the substrate 10, and the barrier structure 500 is disposed in the first metal layer 70.

Exemplarily, when the side of the second organic encapsulation layer 40 facing away from the substrate 10 is formed with the first metal layer 70, the barrier structure 500 may be disposed in the first metal layer 70, that is, the barrier structure 500 may be prepared and formed using the material of the first metal layer 70 so that an overall thickness of the display panel is reduced.

Figure 10:
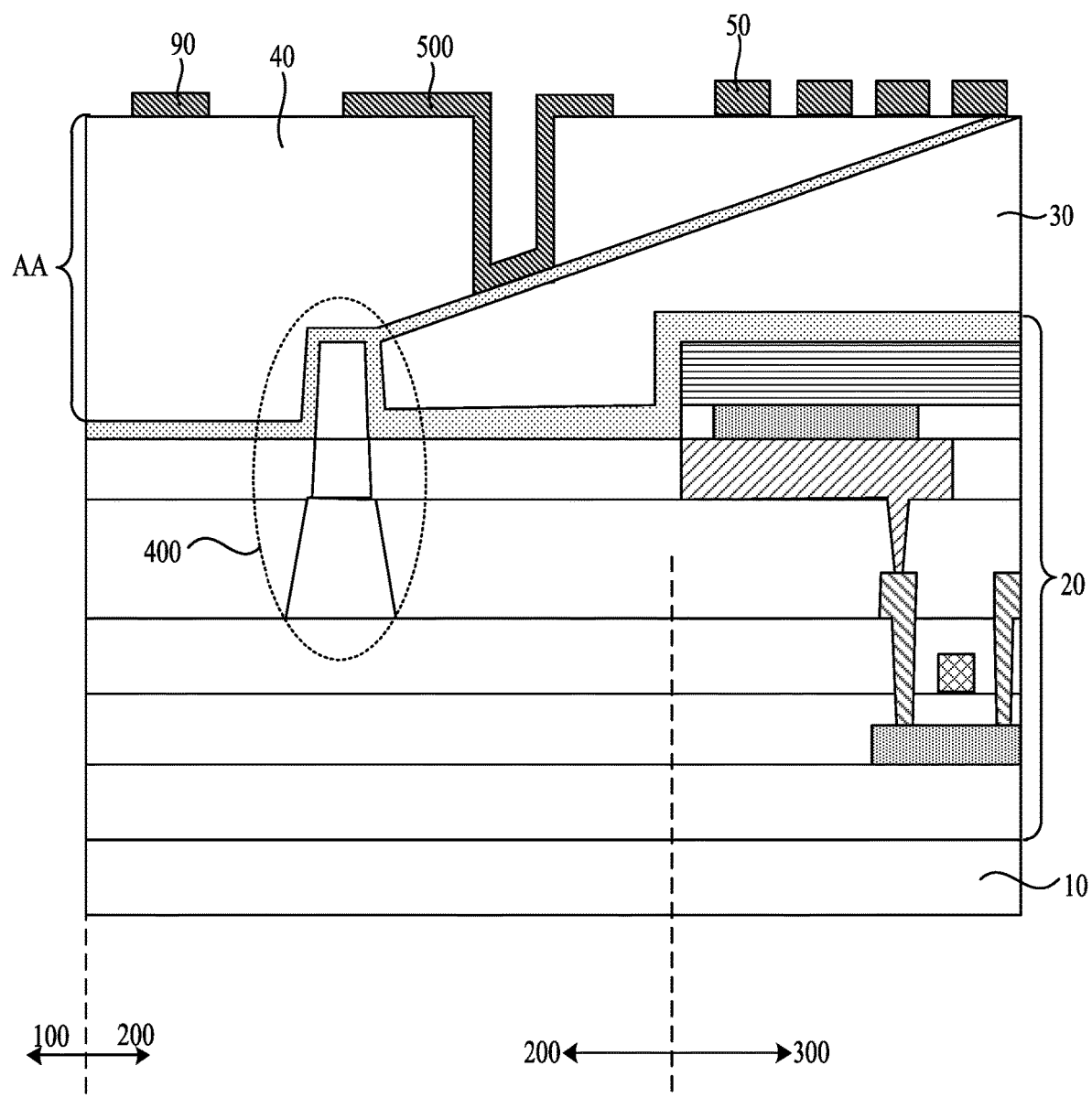
FIG. 10 is a cross-sectional structural diagram of another display panel according to an embodiment of the present disclosure.

In an embodiment, on the basis of the above-mentioned embodiments, FIG. 10 is a cross-sectional structural diagram of another display panel according to an embodiment of the present disclosure. As shown in FIG. 10, the display panel further includes an electrostatic protection structure 90, the electrostatic protection structure 90 surrounds the opening region 100, and the barrier structure 500 and the electrostatic protection structure 90 are prepared in a same layer.

In the related art, the transition region 200 of the display panel is provided with the electrostatic protection structure 90, the electrostatic protection structure 90 surrounds the opening region 100, and the electrostatic protection structure 90 is utilized to export electrostatic charges in the display region 300 of the display panel. The barrier structure 500 and the electrostatic protection structure 90 are prepared in the same layer and the process complexity of the display panel can be reduced. On the other hand, the electrostatic protection structure 90 may be reused as the barrier structure 500 and to prevent the water and oxygen in the external environment from entering the second organic encapsulation layer 40 facing the display region 300 through the opening region 100 while exporting the electrostatic charges of the display panel.

In an embodiment, the display panel further includes a touch electrode 50, and the touch electrode 50 and the barrier structure 500 are disposed in a same layer.

Figure 11:
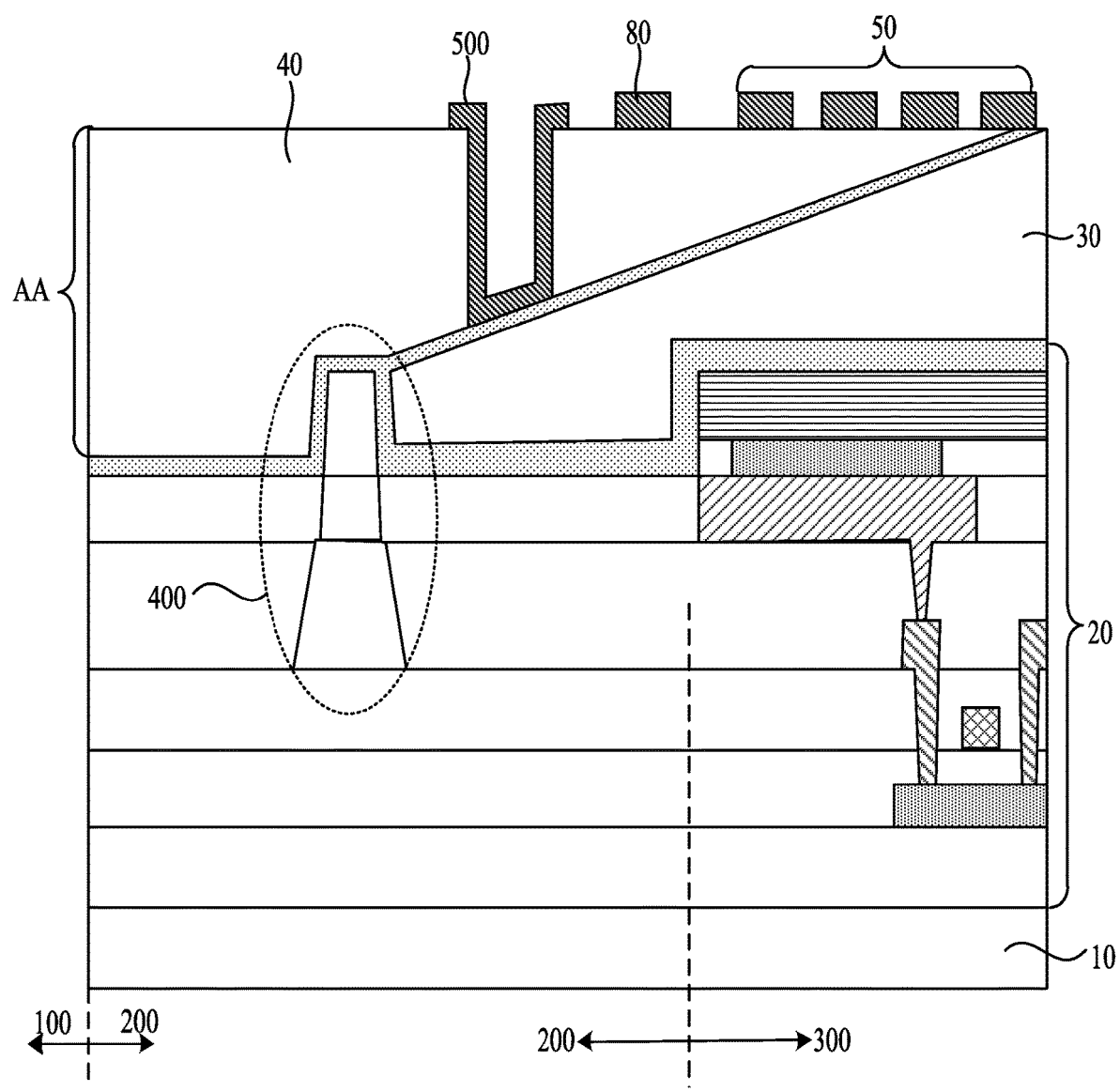
FIG. 11 is a cross-sectional structural diagram of another display panel according to an embodiment of the present disclosure.

Exemplarily, as shown in FIG. 11, when the display panel is the on cell display panel, the side of the second organic encapsulation layer 40 facing away from the substrate 10 is formed with the touch electrode 50 so that the touch function of the display panel is achieved. In this case, the touch electrode 50 and the barrier structure 500 may be disposed in a same layer.

In an embodiment, the display panel further includes a touch compensation ring 80, the touch compensation ring 80 is disposed on a side of the second organic encapsulation layer 40 facing away from the substrate 10, a vertical projection of the touch compensation ring 80 on the substrate 10 is within a vertical projection of the transition region 200 on the substrate 10, and the barrier structure 500 and the touch compensation ring 80 are prepared in a same layer.

In the related art, the touch compensation ring 80 is generally arranged around the opening region 100, and the touch compensation ring 80 is utilized to compensate the sensing capacitance of a touch electrode 50 close to the opening region 100, so that the touch electrode 50 close to the opening region 100 is prevented from affecting the touch effect due to incomplete sensing area, and the uniformity of the touch performance of the effective display region in the display panel is ensured. When the touch compensation ring 80 is formed in the display panel, the barrier structure 500 and the touch compensation ring 80 may be formed in the same layer process so that the complexity of the preparation process of the display panel is reduced.

Figure 12:
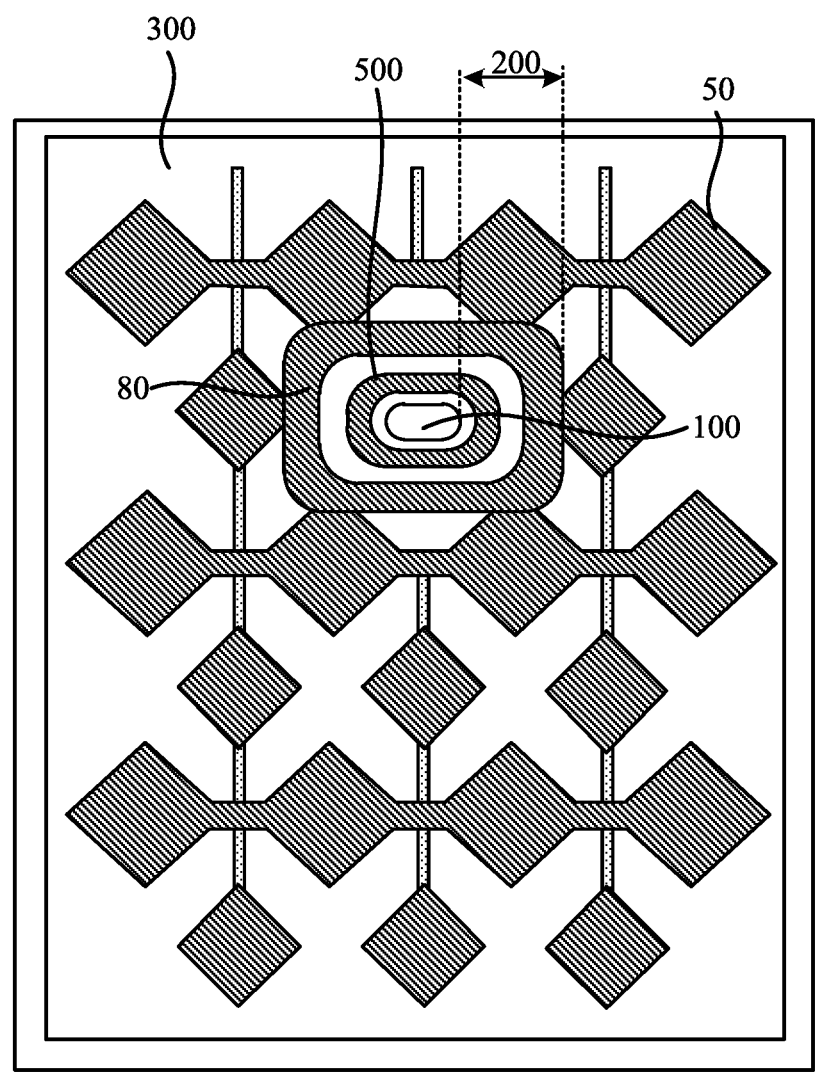
FIG. 12 is a structural diagram of the display panel of FIG. 11.
Figure 13:
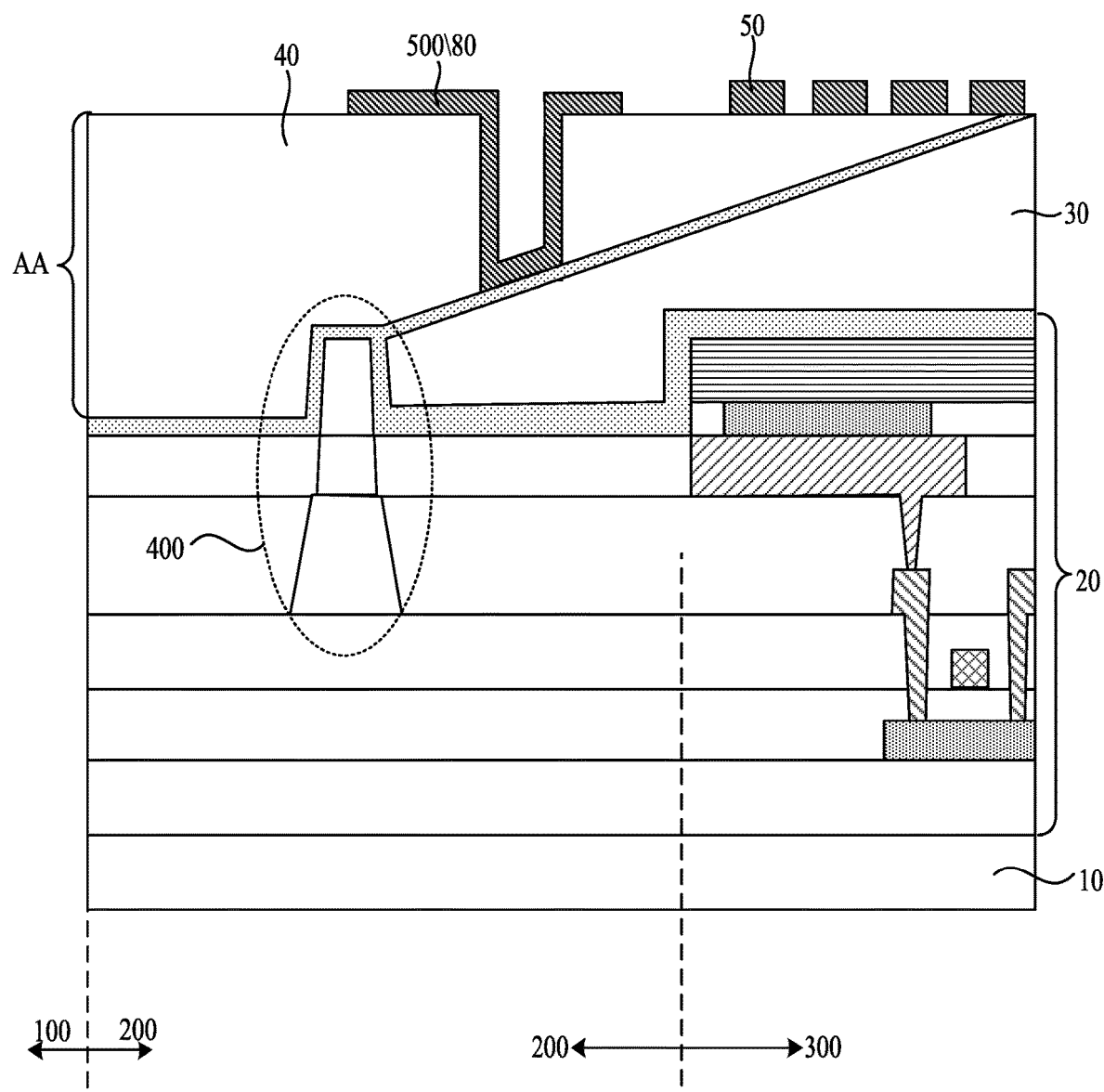
FIG. 13 is a cross-sectional structural diagram of another display panel according to an embodiment of the present disclosure.
Figure 14:
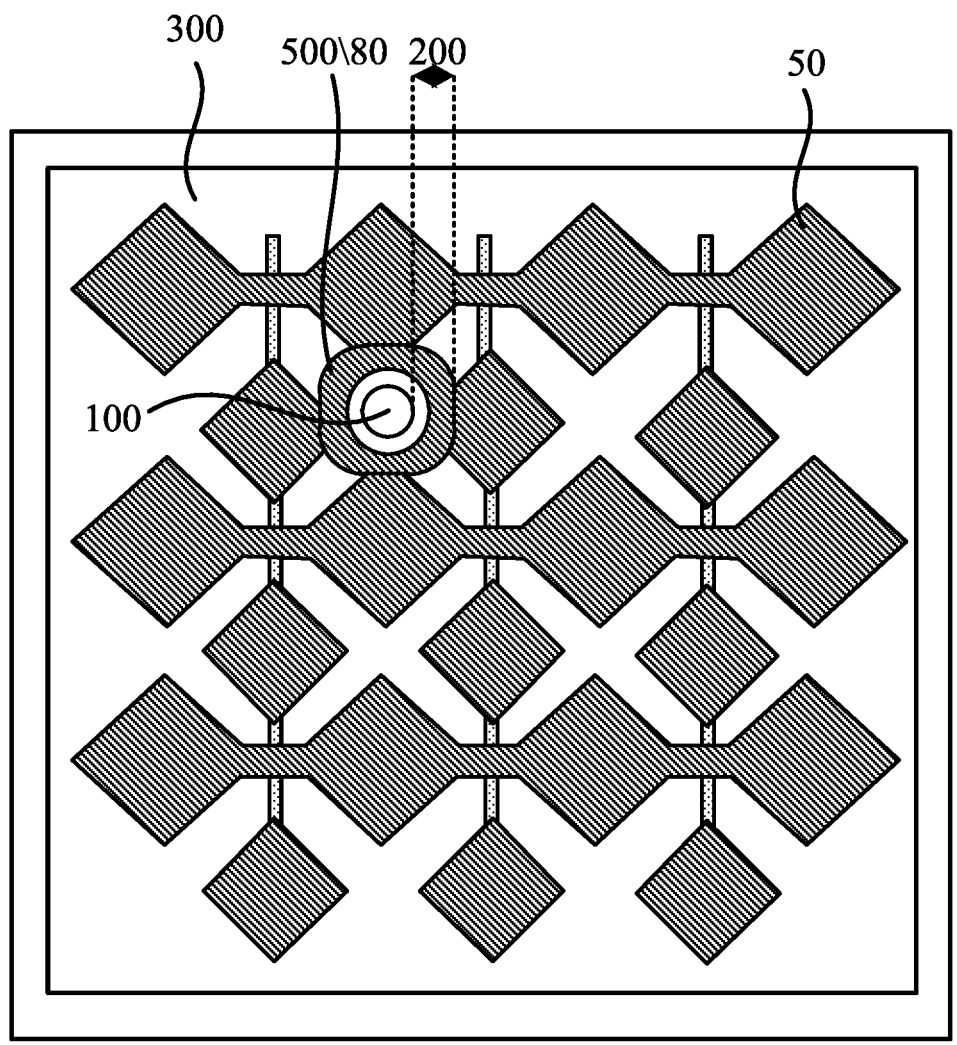
FIG. 14 is a structural diagram of the display panel of FIG. 13.

It is to be noted that in a case where the barrier structure 500 and the touch compensation ring 80 are formed in the same layer process, the barrier structure 500 and the touch compensation ring 80 may be respectively formed at different positions. As shown in FIGS. 11 and 12, the barrier structure 500 and the touch compensation ring 80 are formed in the same layer process, the touch compensation ring 80 is configured to compensate the sensing capacitance of the touch electrode 50 close to the opening region 100, and the barrier structure 500 is configured to block the water and oxygen in the external environment from entering the second organic encapsulation layer 40 facing the display region 300 through the opening region 100. The touch compensation ring 80 may also be reused as the barrier structure 500. As shown in FIGS. 13 and 14, on one hand, the touch compensation ring 80 can compensate the sensing capacitance of the touch electrode 50 close to the opening region 100, and on the other hand, the touch compensation ring 80 can block the water and oxygen in the external environment from entering the second organic encapsulation layer 40 facing the display region 300 through the opening region 100.

When the touch electrodes 50 of the display panel are of different types, the barrier structures 500 are disposed in different layers, which will be illustrated by specific embodiments below.

Figure 15:
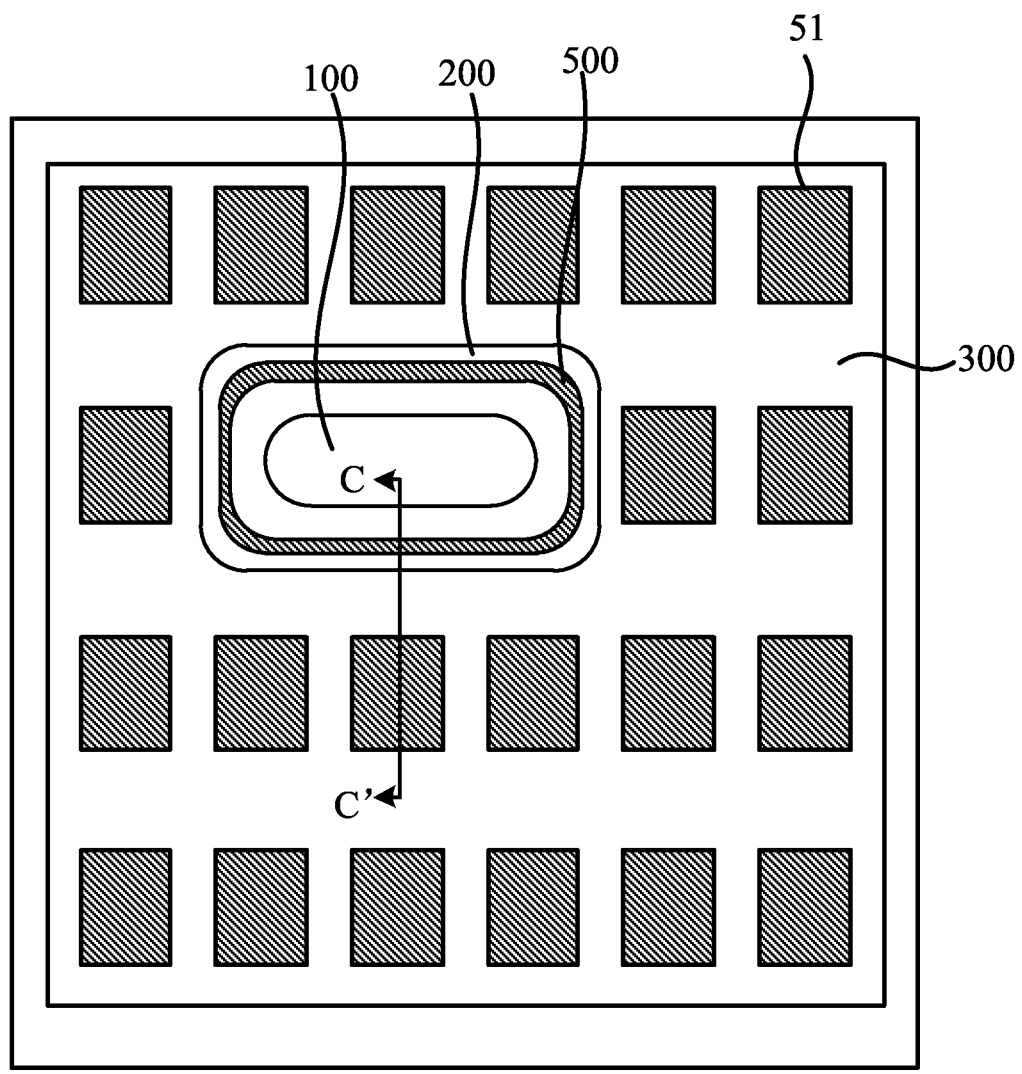
FIG. 15 is a structural diagram of another display panel according to an embodiment of the present disclosure.
Figure 16:
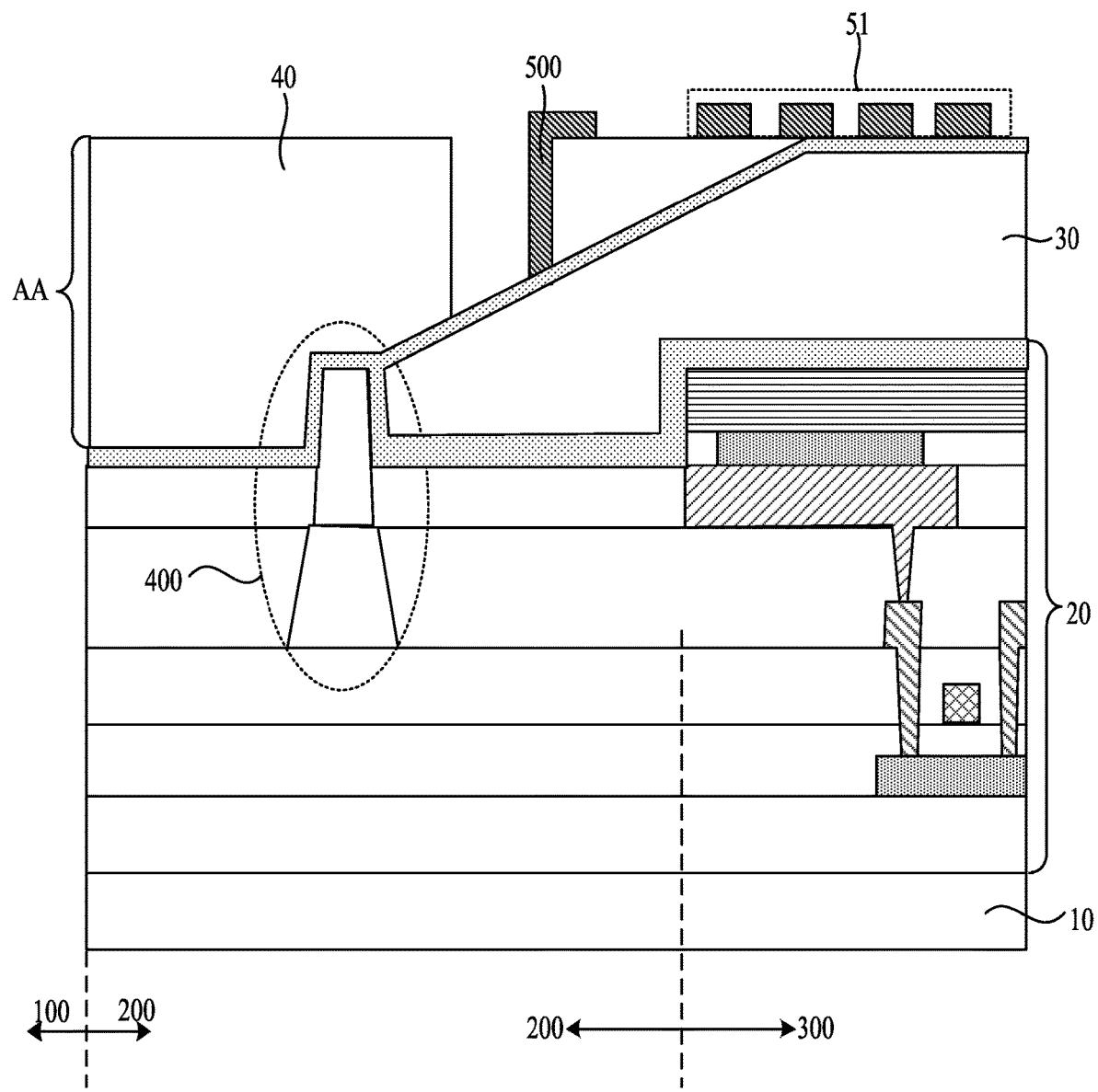
FIG. 16 is a cross-sectional structural diagram of the display panel of FIG. 15 taken along a line CC'.

In an embodiment, on the basis of the above-mentioned embodiments, FIG. 15 is a structural diagram of another display panel according to an embodiment of the present disclosure, and FIG. 16 is a cross-sectional structural diagram of the display panel of FIG. 15 taken along a line CC'. As shown in FIGS. 15 and 16, the touch electrode 50 includes a self-capacitive touch electrode, the self-capacitive touch electrode includes first touch electrode blocks 51, and the plurality of first touch electrode blocks 51 and the barrier structure 500 are disposed in a same layer.

In conjunction with FIGS. 15 and 16, the self-capacitive touch electrode includes the plurality of first touch electrode blocks 51, and the plurality of first touch electrode blocks 51 and the barrier structure 500 are disposed in a same layer. The first touch electrode blocks 51 and the barrier structure 500 are disposed in a same layer and an overall thickness of the display panel is reduced.

Figure 17:
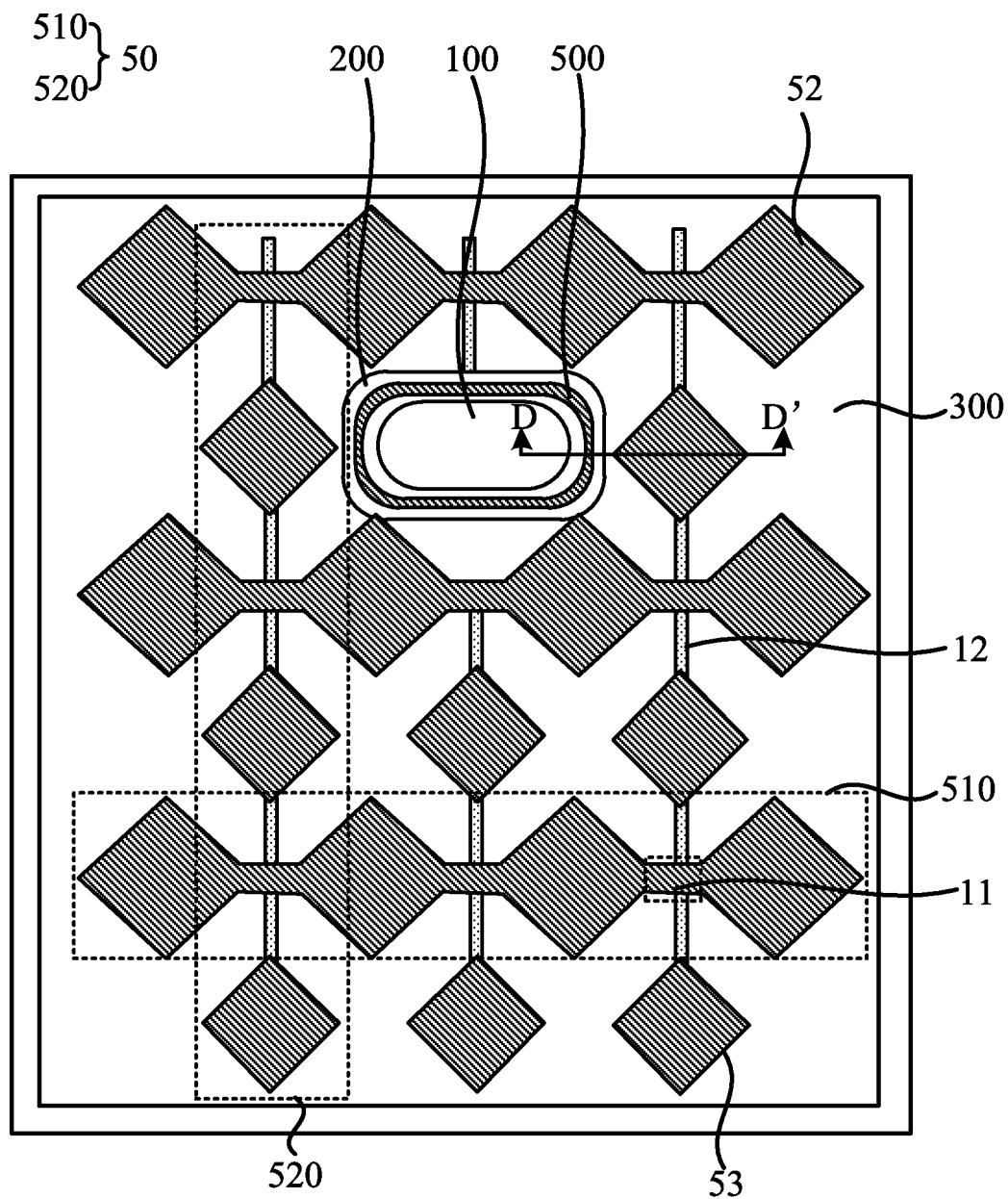
FIG. 17 is a structural diagram of another display panel according to an embodiment of the present disclosure.
Figure 18:
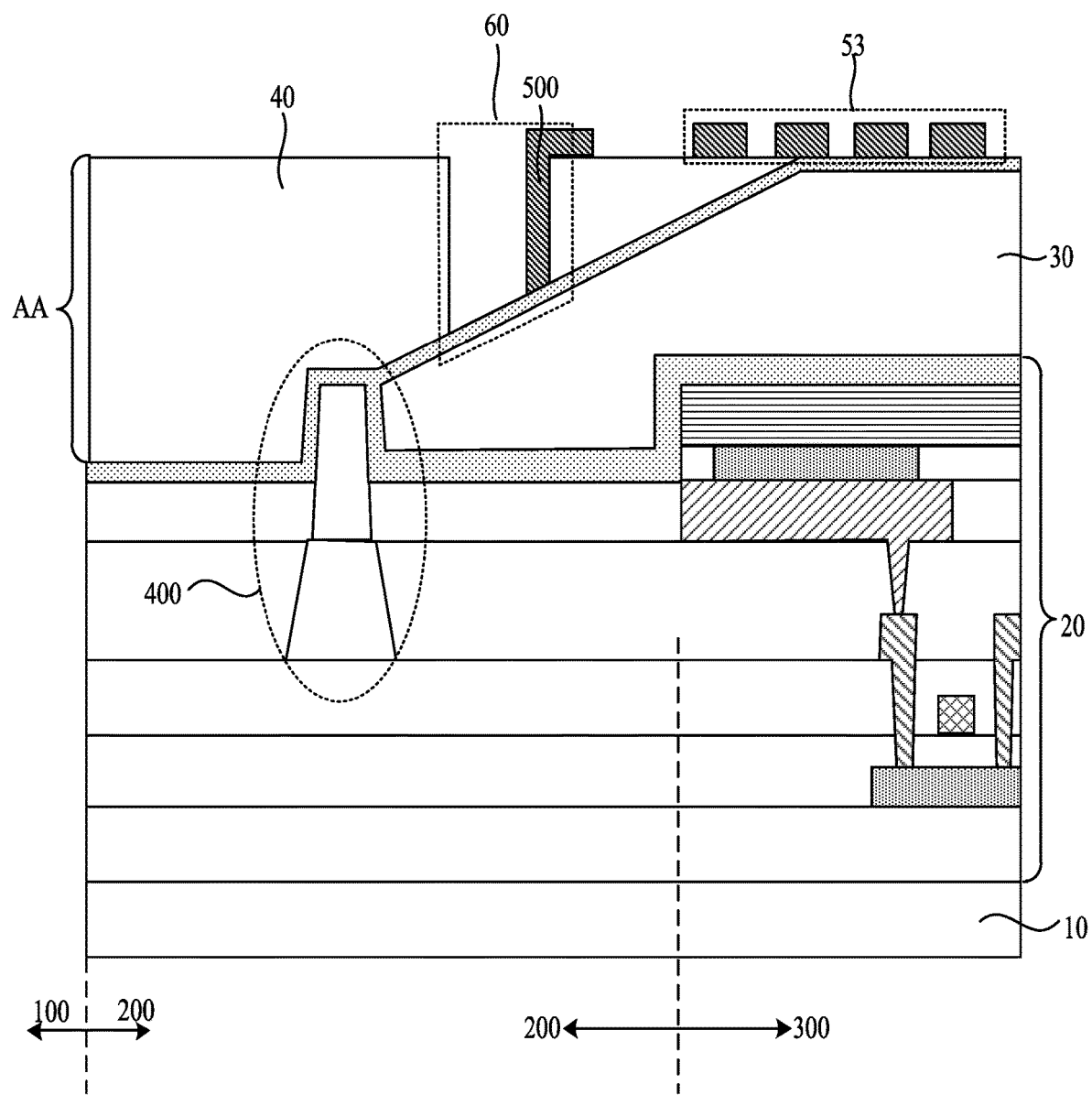
FIG. 18 is a cross-sectional structural diagram of the display panel of FIG. 17 taken along a line DD'.

In an embodiment, on the basis of the above-mentioned embodiments, FIG. 17 is a structural diagram of another display panel according to an embodiment of the present disclosure, and FIG. 18 is a cross-sectional structural diagram of the display panel of FIG. 17 taken along a line DD'. As shown in FIGS. 17 and 18, the touch electrode 50 includes a mutual-capacitive touch electrode, the mutual-capacitive touch electrode includes a touch driving electrode 510 and a touch sensing electrode 520, and the touch driving electrode 510 and the touch sensing electrode 520 are disposed in a same layer and insulated from each other. The touch driving electrode 510 includes second touch electrode blocks 52, adjacent two second touch electrode blocks 52 among the plurality of second touch electrode blocks are electrically connected to each other through a first connection bridge 11, and the first connection bridge 11 and the plurality of second touch electrode blocks 52 are disposed in a same layer. The touch sensing electrode 520 includes third touch electrode blocks 53, adjacent two third touch electrode blocks 53 among the plurality of third touch electrode blocks are electrically connected to each other through a second connection bridge 12, and the second connection bridge 12 and the plurality of third touch electrode blocks 53 are disposed in different layers. The plurality of second touch electrode blocks 52, the plurality of third touch electrode blocks 53 and the barrier structure 500 are disposed in a same layer.

Still referring to FIGS. 17 and 18, the barrier structure 500, the second touch electrode blocks 52, and the third touch electrode blocks 53 are disposed in the same layer, and since the third touch electrode blocks 53 and the second connection bridge 12 are disposed in different layers, in a process of electrically connecting two adjacent third touch electrode blocks 53 to the second connection bridge 12, a through hole needs to be formed to electrically connect the third touch electrode blocks 53 to the second connection bridge 12. Therefore, the first groove 60 may be formed in a process of forming the through hole, and after the through hole is formed, the barrier structure 500 is formed in the first groove 60 while the second touch electrode blocks 52 and the third touch electrode blocks 53 are formed, so that the complexity of the preparation process of the display panel can be reduced.

Figure 19:
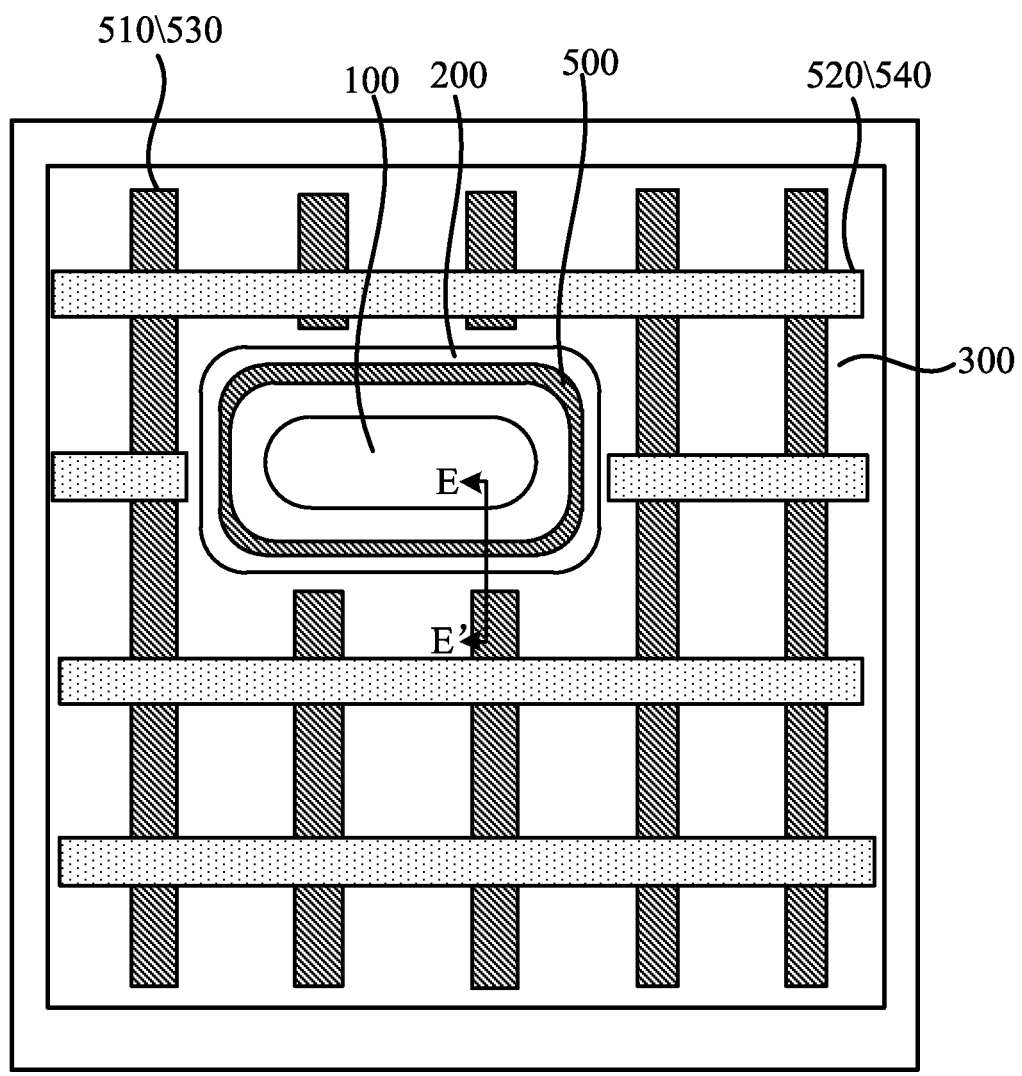
FIG. 19 is a structural diagram of another display panel according to an embodiment of the present disclosure.
Figure 20:
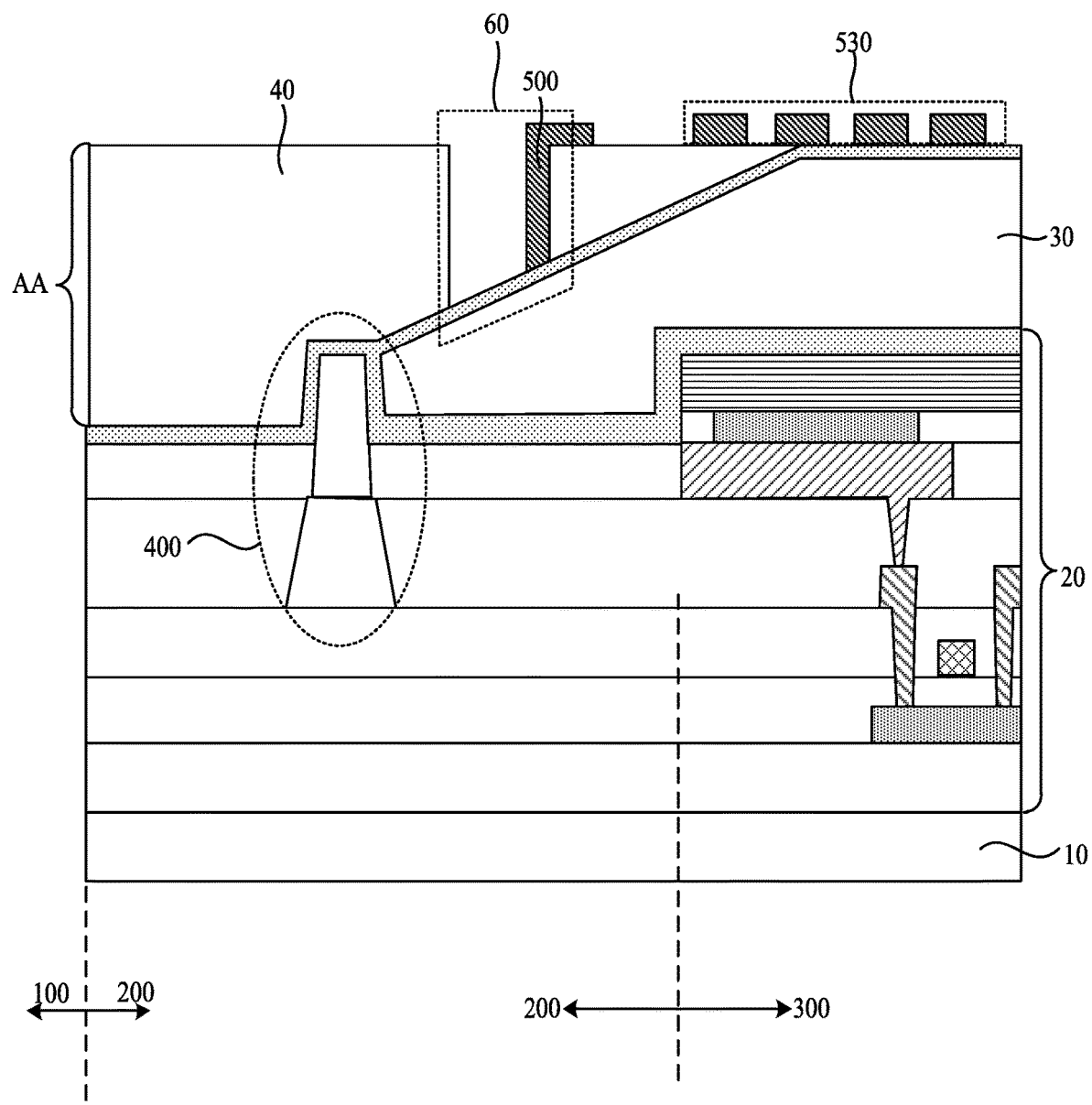
FIG. 20 is a cross-sectional structural diagram of the display panel of FIG. 19 taken along a line EE'.

In an embodiment, on the basis of the above-mentioned embodiments, FIG. 19 is a structural diagram of another display panel according to an embodiment of the present disclosure, and FIG. 20 is a cross-sectional structural diagram of the display panel of FIG. 19 taken along a line EE'. As shown in FIGS. 19 and 20, the touch electrode 50 includes a mutual-capacitive touch electrode, the mutual-capacitive touch electrode includes a touch driving electrode 510 and a touch sensing electrode 520, and the touch driving electrode 510 and the touch sensing electrode 520 are disposed in different layers; the touch driving electrode 510 includes touch driving electrode strips 530, and the touch sensing electrode 520 includes touch sensing electrode strips 540; and the plurality of touch driving electrode strips 530 and the barrier structure 500 are disposed in a same layer or the plurality of touch sensing electrode strips 540 and the barrier structure 500 are disposed in a same layer.

Exemplarily, referring to FIGS. 19 and 20, when the touch electrode of the display panel is the mutual-capacitive touch electrode and the touch driving electrode 510 and the touch sensing electrode 520 of the mutual-capacitive touch electrode are disposed in different layers, in this case, the plurality of touch driving electrode strips 530 and the barrier structure 500 may be disposed in the same layer or the plurality of touch sensing electrode strips 540 and the barrier structure 500 are disposed in the same layer. FIG. 17 exemplarily illustrates that the barrier structure 500 and the touch driving electrode strips 530 are disposed in the same layer. In this manner, not only the overall thickness of the touch display device can be reduced, but also the preparation of a film of the touch driving electrode strips and the barrier structure can be completed in one process in a case where the barrier structure 500 and the touch driving electrode strips 530 are disposed in the same layer. Therefore, only one-time etching process is required in the manufacturing process without separate mask manufacturing, thus saving the cost, reducing the manufacturing process, improving the production efficiency and reducing the process complexity.

It is to be noted that in FIGS. 16, 18, and 20, exemplarily, the touch electrode is provided with a metal grid structure. The touch electrode is the metal grid structure and the influence of the touch electrode on the display effect of the display panel is avoided.

In an embodiment, still referring to FIG. 3, the display panel further includes a first inorganic encapsulation layer 31, a second inorganic encapsulation layer 32, and a third inorganic encapsulation layer 33. The first inorganic encapsulation layer 31 is disposed on a side of the first organic encapsulation layer 30 facing the substrate 10, the second inorganic encapsulation layer 32 is disposed between the first organic encapsulation layer 30 and the second organic encapsulation layer 40, and the third inorganic encapsulation layer 33 is disposed on a side of the second organic encapsulation layer 40 facing away from the substrate 10.

Exemplarily, as shown in FIG. 3, the side of the first organic encapsulation layer 30 facing the substrate 10 is provided with the first inorganic encapsulation layer 31, and the side of the first organic encapsulation layer 30 facing away from the substrate 10 is provided with the second inorganic encapsulation layer 32, so that the inorganic encapsulation layer can be utilized to prevent the light-emitting elements of the sub-pixel of the display region 300 from being corroded by the external water and oxygen. The side of the second organic encapsulation layer 40 facing away from the substrate 10 is formed with the third inorganic encapsulation layer 33 so that the second organic encapsulation layer 40 can be prevented from being corroded by the water and oxygen in the external environment.

Figure 21:
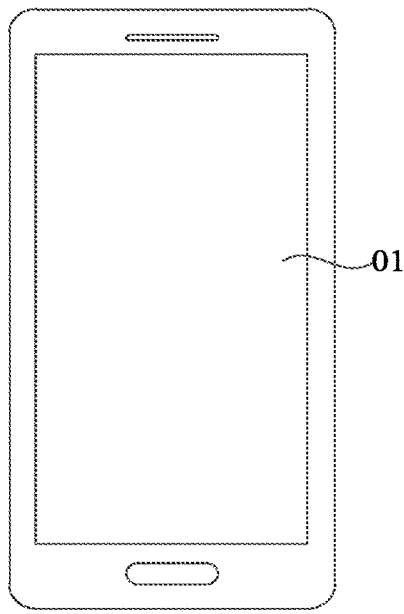
FIG. 21 is a structural diagram of a display device according to an embodiment of the present disclosure.

In an embodiment, on the basis of the above-mentioned embodiments, FIG. 21 is a structural diagram of a display device according to an embodiment of the present disclosure. As shown in FIG. 21, the display device includes the display panel 01 provided by the embodiment of the present disclosure, so the display device also has the beneficial effects of the display panel provided by the embodiment of the present disclosure, and similarities may be understood with reference to the above description and will not be repeated in the following.

It is to be noted that the display device provided by the embodiment of the present disclosure may be a mobile phone, a tablet computer, a smart wearable device (such as a smart watch) and other display devices having a fingerprint identification function, which is not limited in the embodiments of the present disclosure.

Figure 22:
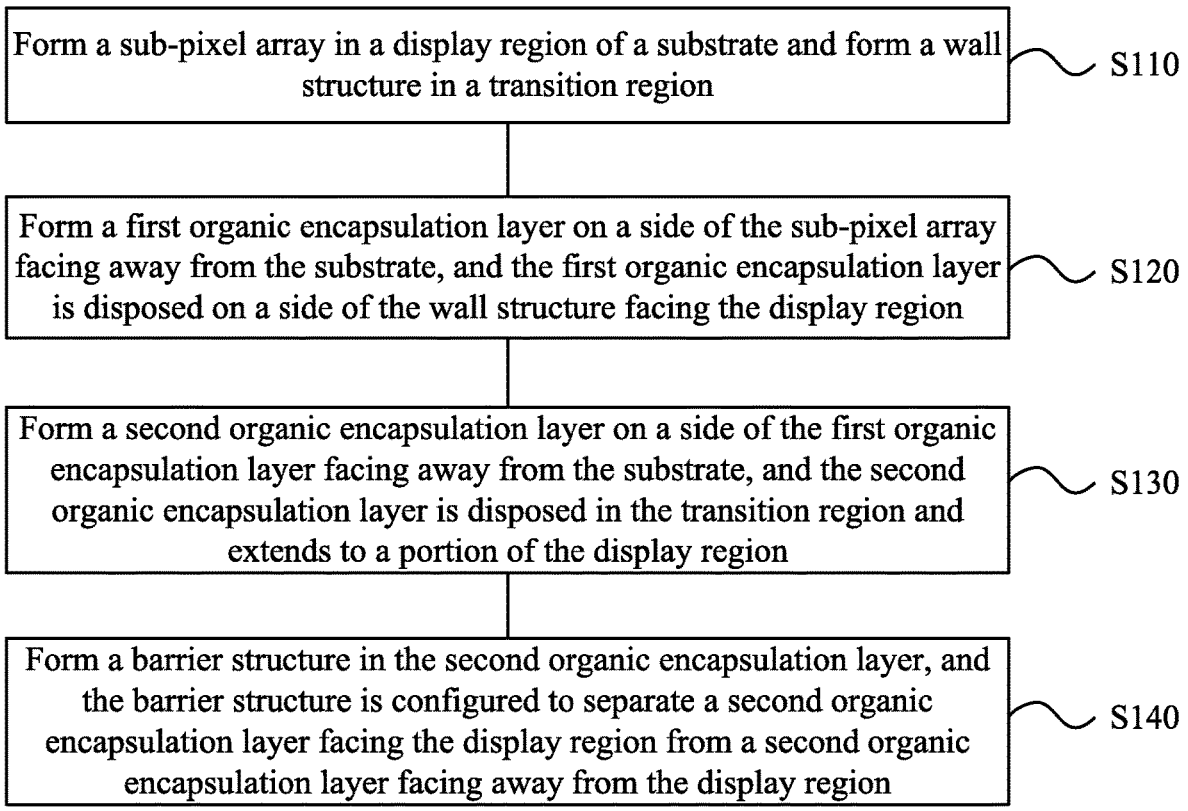
FIG. 22 is a flowchart of a method for preparing a display panel according to an embodiment of the present disclosure.

In an embodiment, on the basis of the above-mentioned embodiments, an embodiment of the present disclosure further provides a method for preparing a display panel. The display panel includes a substrate, the substrate includes a reserved opening region, a transition region and a display region, and the display region at least partially surrounds the reserved opening region. The transition region is disposed between the display region and the reserved opening region, as shown in FIG. 22. The method includes steps described below.

In S110, a sub-pixel array is formed in the display region of the substrate and a wall structure is formed in the transition region.

Firstly, the sub-pixel array is formed in the display region of the substrate and the wall structure is formed in the transition region.

In S120, a first organic encapsulation layer is formed on a side of the sub-pixel array facing away from the substrate. The first organic encapsulation layer is disposed on a side of the wall structure facing the display region.

The first organic encapsulation layer is formed on the side of the sub-pixel array facing away from the substrate. The first organic encapsulation layer is disposed on the side of the wall structure facing the display region. The first organic encapsulation layer is utilized to encapsulate the sub-pixel array so that the light-emitting elements of the sub-pixel array are prevented from being The first organic encapsulation layer is used to encapsulate the sub-pixel array, so that the light emitting elements of the sub-pixel array are prevented from being eroded by the water and oxygen in the external environment.

In S130, a second organic encapsulation layer is formed on a side of the first organic encapsulation layer facing away from the substrate. The second organic encapsulation layer is disposed in the transition region and extends to a portion of the display region.

The second organic encapsulation layer is formed on the side of the first organic encapsulation layer facing away from the substrate, and the second organic encapsulation layer is disposed in the transition region and extends to the portion of the display region so that the planarization between the transition region and the display region is ensured.

In S140, a barrier structure is formed in the second organic encapsulation layer. The barrier structure is configured to separate a second organic encapsulation layer facing the display region from a second organic encapsulation layer facing away from the display region.

A first groove is formed in the second organic encapsulation layer by the etching process so that a portion of the barrier structure is located in the first groove, and then a first barrier structure separates the second organic encapsulation layer facing the display region from the second organic encapsulation layer facing away from the display region.

In an embodiment, the barrier structure includes a first portion and a second portion, the first portion of the barrier structure is disposed between the wall structure and the display region, and the second portion of the barrier structure is disposed on a side of the second organic encapsulation layer facing away from the substrate. The step of forming the barrier structure in the second organic encapsulation layer includes a step described below.

The second organic encapsulation layer is etched to form a first groove. The first portion of the barrier structure is at least formed at a side wall of the first groove facing the display region.

What is claimed is:

1. A display panel, comprising:
   an opening region, a transition region, and a display region; wherein the display region at least partially surrounds the opening region, the transition region is disposed between the display region and the opening region; and the transition region of the display panel is further provided with at least one wall structure, and the at least one wall structure surrounds the opening region; and
   the display panel further comprises:
   a substrate and a sub-pixel array disposed on the substrate and disposed in the display region;
   a first organic encapsulation layer disposed on a side of the sub-pixel array facing away from the substrate and disposed on a side of the at least one wall structure facing the display region;
   a second organic encapsulation layer disposed on a side of the first organic encapsulation layer facing away from the substrate and disposed in the transition region and extends to a portion of the display region; and
   a barrier structure configured to separate a second organic encapsulation layer facing the display region from a second organic encapsulation layer facing away from the display region.

2. The display panel of claim 1, wherein the barrier structure comprises a first portion and a second portion, the first portion of the barrier structure is disposed between the at least one wall structure and the display region, and the second portion of the barrier structure is disposed on a side of the second organic encapsulation layer facing away from the substrate.

3. The display panel of claim 2, wherein the display panel comprises:
   a first groove penetrating through the second organic encapsulation layer; and
   the first portion of the barrier structure covers at least a side wall of the first groove facing the display region.

4. The display panel of claim 3, wherein the first portion of the barrier structure covers the first groove.

5. The display panel of claim 4, wherein the first portion of the barrier structure comprises:
   a first sub-portion, a second sub-portion, and a third sub-portion, the first sub-portion is disposed on a side wall of the first groove facing the display region, and the second sub-portion is disposed on a side wall of the first groove facing the opening region; and
   a height of the first sub-portion is the same as a height of the second sub-portion along a direction perpendicular to a plane where the substrate is located.

6. The display panel of claim 1, further comprising:
   a first metal layer, wherein the first metal layer is disposed on a side of the second organic encapsulation layer facing away from the substrate; and
   the barrier structure is disposed in the first metal layer.

7. The display panel of claim 1, further comprising:
an electrostatic protection structure, wherein the electrostatic protection structure surrounds the opening region; and
the barrier structure and the electrostatic protection structure are prepared in a same layer.

8. The display panel of claim 1, further comprising a touch electrode, wherein the touch electrode and the barrier structure are disposed in a same layer.

9. The display panel of claim 8, further comprising:
a touch compensation ring, wherein the touch compensation ring is disposed on a side of the second organic encapsulation layer facing away from the substrate;
a vertical projection of the touch compensation ring on the substrate is within a vertical projection of the transition region on the substrate; and
the barrier structure and the touch compensation ring are prepared in a same layer.

10. The display panel of claim 8, wherein the touch electrode comprises:
a self-capacitive touch electrode, and the self-capacitive touch electrode comprises a plurality of first touch electrode blocks; and
the plurality of first touch electrode blocks and the barrier structure are disposed in a same layer.

11. The display panel of claim 8, wherein the touch electrode comprises:
a mutual-capacitive touch electrode, the mutual-capacitive touch electrode comprises a touch driving electrode and a touch sensing electrode, and the touch driving electrode and the touch sensing electrode are disposed in a same layer and insulated from each other;
the touch driving electrode comprises a plurality of second touch electrode blocks, adjacent two second touch electrode blocks among the plurality of second touch electrode blocks are electrically connected to each other through a first connection bridge, and the first connection bridge and the plurality of second touch electrode blocks are disposed in a same layer; the touch sensing electrode comprises a plurality of third touch electrode blocks, adjacent two third touch electrode blocks among the plurality of third touch electrode blocks are electrically connected to each other through a second connection bridge, and the second connection bridge and the plurality of third touch electrode blocks are disposed in different layers; and
the plurality of second touch electrode blocks, the plurality of third touch electrode blocks and the barrier structure are disposed in a same layer.

12. The display panel of claim 8, wherein the touch electrode comprises:
a mutual-capacitive touch electrode, the mutual-capacitive touch electrode comprises a touch driving electrode and a touch sensing electrode, and the touch driving electrode and the touch sensing electrode are disposed in different layers;
the touch driving electrode comprises a plurality of touch driving electrode strips, and the touch sensing electrode comprises a plurality of touch sensing electrode strips; and
the plurality of touch driving electrode strips and the barrier structure are disposed in a same layer or the plurality of touch sensing electrode strips and the barrier structure are disposed in a same layer.

13. The display panel of claim 1, further comprising:
a first inorganic encapsulation layer, a second inorganic encapsulation layer, and a third inorganic encapsulation layer; wherein the first inorganic encapsulation layer is disposed on a side of the first organic encapsulation layer facing the substrate, the second inorganic encapsulation layer is disposed between the first organic encapsulation layer and the second organic encapsulation layer, and the third inorganic encapsulation layer is disposed on a side of the second organic encapsulation layer facing away from the substrate.

14. A display device, comprising a display panel;
wherein the display panel comprises:
an opening region, a transition region, and a display region; wherein the display region at least partially surrounds the opening region, the transition region is disposed between the display region and the opening region; and the transition region of the display panel is further provided with at least one wall structure, and the at least one wall structure surrounds the opening region; and
the display panel further comprises:
a substrate and a sub-pixel array disposed on the substrate and disposed in the display region;
a first organic encapsulation layer disposed on a side of the sub-pixel array facing away from the substrate and disposed on a side of the at least one wall structure facing the display region;
a second organic encapsulation layer disposed on a side of the first organic encapsulation layer facing away from the substrate and disposed in the transition region and extends to a portion of the display region; and
a barrier structure configured to separate a second organic encapsulation layer facing the display region from a second organic encapsulation layer facing away from the display region.

15. A method for preparing a display panel, wherein the display panel comprises:
a substrate, the substrate comprises a reserved opening region, a transition region and a display region, and the display region at least partially surrounds the reserved opening region, and the transition region is disposed between the display region and the reserved opening region; and the method comprises:
forming a sub-pixel array in the display region of the substrate and forming a wall structure in the transition region;
forming a first organic encapsulation layer on a side of the sub-pixel array facing away from the substrate, wherein the first organic encapsulation layer is disposed on a side of the wall structure facing the display region;
forming a second organic encapsulation layer on a side of the first organic encapsulation layer facing away from the substrate, wherein the second organic encapsulation layer is disposed in the transition region and extends to a portion of the display region; and
forming a barrier structure in the second organic encapsulation layer, wherein the barrier structure is configured to separate a second organic encapsulation layer facing the display region from a second organic encapsulation layer facing away from the display region.

16. The method for preparing a display panel of claim 15, wherein the barrier structure comprises:
a first portion and a second portion, the first portion of the barrier structure is disposed between the wall structure and the display region, and the second portion of the barrier structure is disposed on a side of the second organic encapsulation layer facing away from the substrate; and forming the barrier structure in the second organic encapsulation layer comprises:

etching on the second organic encapsulation layer to form a first groove, wherein the first portion of the barrier structure is at least formed at a side wall of the first groove facing the display region.

* * * * *